(12) United States Patent
Hurley et al.

(10) Patent No.: US 8,909,508 B2
(45) Date of Patent: Dec. 9, 2014

(54) PETROGRAPHIC IMAGE ANALYSIS FOR DETERMINING CAPILLARY PRESSURE IN POROUS MEDIA

(75) Inventors: Neil F. Hurley, Boston, MA (US);
Mustafa Al Ibrahim, Safwa (SA);
Weishu Zhao, Quincy, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 489 days.

(21) Appl. No.: 13/407,561

(22) Filed: Feb. 28, 2012

(65) Prior Publication Data

US 2012/0275658 A1    Nov. 1, 2012

Related U.S. Application Data

(60) Provisional application No. 61/447,434, filed on Feb. 28, 2011.

(51) Int. Cl.
G06G 7/50   (2006.01)
G06G 7/48   (2006.01)
G06T 7/00   (2006.01)
G06T 7/60   (2006.01)
E21B 49/08  (2006.01)

(52) U.S. Cl.
CPC ............... *G06T 7/0004* (2013.01); *E21B 49/08* (2013.01); *E21B 49/087* (2013.01); *G06T 7/0081* (2013.01); *G06T 7/602* (2013.01); *G06T 2207/10056* (2013.01); *G06T 2207/20148* (2013.01); *G06T 2207/20152* (2013.01); *G06T 2207/30108* (2013.01)
USPC .................................................. 703/9; 703/10

(58) Field of Classification Search
CPC ... E21B 49/003; E21B 49/005; E21B 49/006; E21B 49/008; E21B 49/08; E21B 49/087; E21B 49/00; E21B 43/00; G01V 11/00; G06F 2217/16; G06F 17/5018
USPC ........................................................ 703/9, 10
See application file for complete search history.

(56) References Cited

U.S. PATENT DOCUMENTS

| | | | |
|---|---|---|---|
| 4,783,751 A | 11/1988 | Ehrlich et al. | |
| 4,868,883 A | 9/1989 | Chen | |
| 5,809,163 A * | 9/1998 | Delhomme et al. | 382/109 |
| 6,985,612 B2 | 1/2006 | Hahn | |
| 7,279,679 B2 | 10/2007 | Old et al. | |
| 8,311,788 B2 | 11/2012 | Hurley et al. | |
| 2005/0256643 A1 | 11/2005 | Botnott | |
| 2009/0259446 A1 | 10/2009 | Zhang et al. | |
| 2009/0262603 A1 | 10/2009 | Hurley et al. | |

(Continued)

OTHER PUBLICATIONS

Oren et al., "Extending Predictive Capabilities to Network Models", SPE Journal, Dec. 1998: pp. 324-336.

(Continued)

*Primary Examiner* — Saif Alhija
(74) *Attorney, Agent, or Firm* — Bridget Laffey; Jakub Michna; Daniel Matthews

(57) ABSTRACT

This disclosed subject matter is generally related to methods for characterizing two-dimensional (2D) and three-dimensional (3D) samples to determine pore-body and pore-throat size distributions and capillary pressure curves in porous media using petrographic image analysis. Input includes high-resolution petrographic images and laboratory-derived porosity measurements. Output includes: (1) pore-body and pore-throat size distributions, and (2) simulated capillary pressure curves for both pore bodies and pore throats.

29 Claims, 21 Drawing Sheets

(56) References Cited

U.S. PATENT DOCUMENTS

| | | |
|---|---|---|
| 2011/0004447 A1 | 1/2011 | Hurley et al. |
| 2011/0004448 A1 | 1/2011 | Hurley et al. |
| 2012/0221306 A1 | 8/2012 | Hurley et al. |
| 2012/0277996 A1 | 11/2012 | Hurley et al. |
| 2012/0281883 A1 | 11/2012 | Hurley et al. |

OTHER PUBLICATIONS

Oren et al., "Process Based Reconstruction of Sandstones and Prediction of Transport Properties," Transport in Porous Media, 2002, vol. 46: pp. 311-343.
Papari et al., "Artistic Edge and corner Enhancing Smoothing", IEEE Transactions on Image Processing, Oct. 2007, vol. 16(10): pp. 2449-2462.
Pittman, Relationship of Porosity and Permeability to Various Parameters Derived from Mercury Injection-Capillary Pressure Curves for Sandstone, AAPG Bulletin, 1992, vol. 76(2): pp. 191-198.
Pittman et al., Use of Pore Casts and Scanning Electron Microscope to Study Pore Geometry, Journal of Sedimentary Petrology, 1970, vol. 40(4): pp. 1153-1157.
Pizer et al., "Adaptive Histogram Equalization and Its Variations", Computer Vision, Graphics and Image Processing, 1987, vol. 39: pp. 355-368.
Preibisch et al., Globally Optimal Stitching of Tiled 3D Microscopic Image Acquisitions, Bioinformatics, Apr. 2009, vol. 25(11): pp. 1-3.
Ramamoorthy et al., "A New Workflow for Petrophysical and Textural Evaluation of Carbonate Reservoirs", presented at the SPWLA 49th Annual Logging Symposium, May 2008: pp. 1-15.
Reid et al., "Monterey Formation Porcelanite Reservoirs of the Elk Hills Field, Kern County, California", AAPG Bulletin, Jan. 2001, vol. 85(1): pp. 169-189.
Roerdink et al., "The Watershed Transform: Definitions, Algorithms and Parallelization Strategies", Fundamenta Informaticae, 2001, vol. 41, pp. 187-228.
Sahoo et al., "A Survey of Thresholding Techniques", Computer Vision, Graphics and Image Processing, 1988, vol. 41: pp. 233-260.
Sezgin et al., Survey Over Image Thresholding Techniques and Quantitative Performance Evaluation, Journal of Electronic Imaging, Jan. 2004, vol. 13(1): pp. 146-168.
Solymar et al., "Image Analysis and Estimation of Porosity and Permeability of Arnager Greensand, Upper Cretaceous, Denmark", Physics and Chemistry of the Earth, Part A: Solid Earth and Geodesy, 1999, vol. 24(7): pp. 587-591.
Suicmez et al., "Pore Network Modeling: A New Technology for SCAL Predictions and Interpretations", Saudi Arabia Oil and Gas, 2008: pp. 36-42.
Taud et al., "Porosity Estimation Method by X-Ray Computed Tomography", Journal of Petroleum Science and Engineering, 2005, vol. 47(3-4): pp. 209-217.
Thomeer, "Introduction of a Pore Geometrical Factor Defined by the Capillary Pressure Curve", Journal of Petroleum Technoglogy, Mar. 1960, vol. 12(3): pp. 73-77.
Tomutsa et al., "SCA2003-47: Focussed Ion Beam Assisted Three-Dimensional Rock Imaging at Submicron Scale", International Symposium of the Society of Core Analysts, Sep. 2003: pp. 1-6.
Tomutsa et al., "Analysis of Chalk Petrophysical Properties by Means of Submicron-Scale Pore Imaging and Modeling", SPE Reservoir Evaluation and Engineering, Jun. 2007, vol. 10: pp. 285-293.
Ribes et al., "Applications of Confocal Macroscope-Microscope Luminescence Imaging to Sediment Cores", New Techniques in Sediment Core Analysis: Geological Society of London, Special Publication, 2006, 267: pp. 141-150.
Vincent et al., Watersheds in Digital Spaces: An Efficient Algorithm Based on Immersion Simulations, IEEE Transactions on Pattern Analysis and Machine Intelligence, Jun. 1991, vol. 13(6): pp. 583-598.
Wardlaw, "Pore Geometry of Carbonate Rocks as Revealed by Pore Casts and Capillary Pressure", AAPG Bulletin, Feb. 1976, vol. 60(2): pp. 245-257.

Wardlaw, "SPE 8843: The Effects of Pore Structure on Displacement Efficiency in Reservoir Rocks and in Glass Micromodels," SPE/DOE Enhanced Oil Recovery Symposium, Apr. 1980: pp. 345-352.
Washburn, "The Dynamics of Capillary Flow", Physical Review, Mar. 1921, vol. XVIII(3): pp. 273-283.
Wikipedia, "Two-photon excitation microscopy," accessed Oct. 23, 2010: pp. 1-3, <http://en.wikipedia.org/wiki/Two-photon_excitation_microscopy>.
Wu et al., "3D Stochastic Modelling of Heterogeneous Porous Media—Applications to Reservoir Rocks", Transport in Porous Media, 2006, vol. 65: pp. 443-467.
Wu et al., "Paper SCA2008-34: Validation of Methods for Multi-Scale Pore Space Reconstruction and Their Use in Prediction of Flow Properties of Carbonate," International Symposium of the Society of Core Analysts, Oct.-Nov. 2008: pp. 1-12.
Yuan et al., "Resolving Pore-Space Characteristics by Rate-Controlled Porosimetry", SPE Formation Evaluation, 1989, vol. 4(1): pp. 17-24.
Zhang et al., "Pore Scale Study of Flow in Porous Media: Scale Dependency, REV, and Statistical REV", Geophysical Research Letters, Apr. 2000, vol. 27(8): pp. 1195-1198.
Zuiderveld, "Chapter VIII.5: Contrast Limited Histograph Equalization," Graphic Gems IV, Academic Press, Inc.: San Diego, 1994: pp. 474-485.
International Search Report and Written Opinion of PCT Application No. PCT/US2012/027041 dated Sep. 26, 2012: pp. 1-10.
Angulo et al., "Fractal Dimensions from Mercury Intrusion Capillary Tests", SPE 23695, presented at the Second Latin American Petroleum Engineering Conference, Mar. 1992: pp. 255-263.
Anselmetti et al., "Quantitative Characterization of Carbonate Pore Systems by Dig8ital Image Analysis", AAPG Bulletin, Oct. 1998, vol. 82(10): pp. 1815-1836.
Bakke et al., "SPE 35479: 3-D Pore-Scale Modelling of Sandstones and Flow Simulations in the Pore Networks," European 3-D Reservoir Conference, Apr. 1996: pp. 136-149.
Bear, "Dynamics of Fluids in Porous Media", Elsevier: New York, 1972: pp. 38-57.
Behseresht et al., "SPE 110581: Infinite-Acting Physically Representative Networks for Capillarity-Controlled Displacements," SPE Annual Technical Conference and Exhibition, Nov. 2007: pp. 1-15.
Bereskin et al., "Carbonate Microporosity: Recognizing Its Existence and Understanding its Role in Hydrocarbon Production", Producing Low Contrast, Low Resistivity Reservoirs Guidebook—1996: pp. 33-42.
Bosl et al., "A Study of Porosity and Permeability Using a Lattice Boltzmann Simulation", Geophysical Research Letters, May 1998, vol. 25(9): pp. 1475-1478.
Bryant et al., "Physically Representative Network Models of Transport in Porous Media", American Institute of Chemical Engineers Journal, 1993, vol. 39(3): pp. 387-396.
Cantrell et al., "Microporosity in Arab Formation Carbonates, Saudi Arabia", GeoArabia, 1999, vol. 4(2): pp. 129-154.
Choquette et al., "Geologic Nomenclature and Classification of Porosity in Sedimentary Carbonates", The American Association of Petroleum Geologists Bulletin, Feb. 1970, vol. 54(2): pp. 207-250.
Pittman, "Microporosity in Carbonate Rocks", The American Association of Petroleum Geologists Bulletin, Oct. 1971, vol. 55(10): pp. 1873-1881.
Clerke, "Permeability, Relative Permeability, Microscopic Displacement Efficiency, and Pore Geometry of M_1 Bimodal Pore Systems in Arab D Limestone", SPE Journal, Mar. 2007: pp. 1-8.
Clerke et al., "Application of Thomeer Hyperbolas to decode the pore systems, facies and reservoir properties of the Upper Jurassic Arab D Limestone, Ghawar field, Saudi Arabia: A 'Rosetta Stone' approach," GeoArabia, 2008, vol. 13(4): pp. 113-160.
Coates et al., "NMR Logging: Principles and Applications", Halliburton Energy Services, 1999: pp. 1-234.
Wikipedia, 2010a, website http://en.wikipedia.org/wiki/Confocal_microscopy, accessed on Oct. 31, 2010; 3 pages.
Petford et al., "Investigation of the Petrophysical Properties of a Porous Sandstone Sample Using Confocal Scanning Laser Microscopy", Petroleum Geoscience, 2001, vol. 7: pp. 99-105.

(56) References Cited

OTHER PUBLICATIONS

Davis et al., "SPE 19407: Image Analysis of Reservoir Pore Systems: State of the Art in Solving Problems Related to Reservoir Quality," Society of Petroleum Engineers, Feb. 1990: pp. 73-82.

Duey, "Quick analysis answers Heidrun questions", Hart Energy Publishing, LP, Mar. 2008: pp. 1-4, <http://www.eandpl.info/index2.php?area=article&articleId=767>.

Okabe et al., "Pore-Scale Heterogeneity Assessed by the Lattice-Boltzmann Method," International Symposium of the Soc. of Core Analysts, Sep. 2006: pp. 1-7.

Dvorkin et al., "SPE 82246: Real Time Monitoring of Permeability, Elastic Moduli and Strength in Sands and Shales Using Digital Rock Physics," SPE European Formation Damage Conference, May 2003: pp. 1-7.

Ehrlich et al., "Petrographic Image Analysis, I. Analysis of Reservoir Pore Complexes", Journal of Sedimentary Petrology, Dec. 1984, vol. 54(4): pp. 1365-1378.

Fabbri, "GIAPP: Geological Image-Analysis Program Package for Estimating Geometrical Probabilities", Computers & Geosciences, 1980, vol. 6: pp. 153-161.

Fredrich et al., "Imaging the Pore Structure of Geomaterials", Science, Apr. 1995, vol. 268: pp. 276-279.

Fredrich, "3D Imaging of Porous Media Using Laser Scanning Confocal Microscopy with Application to Microscale Transport Processes", Physics and Chemistry of the Earth, Part A: Solid Earth and Geodesy, 1999, vol. 24(7): pp. 551-561.

Gies et al., "Petrographic Image Analysis: An Effective Technology for Delineating Reservoir Quality", SPE 26147, presented at the SPE Gas Technology Symposium, Jun. 1993: pp. 99-106.

Gomaa et al., "SPE 102888: Case Study of Permeability, Vug Quantification and Rock Typing in a Complex Carbonate," SPE Annual Technical Conference and Exhibition, Sep. 2006: pp. 1-11.

Greder et al., "Determination of Permeability Distribution at Log Scale in Vuggy Carbonates," SPWLA 37th Annual Logging Symposium, Jun. 1996: pp. 1-14.

Hartmann et al., "Chapter 9: Predicting Reservoir System Quality and Performance," AAPG Treatise of Petroleum Geology/Handbook of Petroleum Geology: Exploring for Oil and Gas Traps, 1999: pp. 9-1-9-154.

Hassall et al., "SPE 88683: Comparison of Permeability Predictors from NMR, Formation Image and Other Logs in a Carbonate Reservoir," 11th Abu Dhabi International Petroleum Exhibition and Conference, Oct. 2004: pp. 1-13.

Holt, "Particle vs. Laboratory Modelling of In Situ Compaction", Physics and Chemistry of the Earth, Part A: Solid Earth and Geodsy, 2001, vol. 26(1-2): pp. 89-93.

Hoshen et al., "Percolation and cluster distribution. I. Cluster multiple labeling technique and critical concentration algorithm", Physical Review B, Oct. 1976, vol. 14(8): pp. 3438-3445.

Huang et al., "Super-Resolution Fluorescence Microscopy", Annual Review of Biochemistry, 2009, vol. 78: pp. 993-1016.

Hurley et al., "SPE 49323:Quantification of Vuggy Porosity in a Dolomite Reservoir from Borehole Images and Core," Society of Petroleum Engineers Annual Technical Conference and Exhibition, Sep. 1998: pp. 1-14.

Hurley et al., "Flow Unit Determination in a Vuggy Dolomite Reservoir," SPWLA 40th Annual Logging Symposium, May-Jun. 1999: pp. 1-14.

Jackson et al., "Three-Dimensional Reservoir Characterization and Flow Simulation of Heterolithic Tidal Sandstones," AAPG Bulletin, Apr. 2005, vol. 89(4): pp. 507-528.

Jackson et al., "Upscaling Permeability Measurements Within Complext Heterolithic Tidal Sandstones", Mathematical Geology, 2003, vol. 35(5): pp. 499-520.

Jennings, "Capillary Pressure Techniques: Application to Exploration and Development Geology", The American Association of Petroleum Geologists Bulletin, Oct. 1987, vol. 71(10): pp. 1196-1209.

Knackstedt et al., "SPE 87009: Digital Core Laboratory: Properties of Reservoir Core Derived from 3D images," SPE Asia-Pacific Conference on Integrated Modeling for Asset Management, Mar. 2004: pp. 1-14.

Kuglin et al., "Paper WeAM 4-5: The Phase Correlation Image Alignment Method," Proceedings of the IEEE International Conference on Cybernetics and Society, 1975: pp. 163-165.

Kuwahara et al., "Processing of RI-Angicardiographic Images", Digital Processing of Biomedical Images, Plenum Press: New York, 1976: pp. 187-202.

Kyprianidis et al., "Image and Video Abstraction by Anisotropic Kuwahara Filtering," Computer Graphics Forum, 2009, vol. 28(7): pp. 1-9.

Marzouk et al., "SPE 29883: Geologic Controls on Wettability of Carbonate Reservoirs, Abu Dhabi, U.A.E.," SPE International, Mar. 1995: pp. 449-460.

Menendez et al., "Confocal Scanning Laser Microscopy Applied to the Study of Pore and Crack Networks in Rocks", Computers & Geoscience, 2007, vol. 27: pp. 1101-1109.

Nix et al., "New Methods Applied to the Microstructure Analysis of Messel Oil Shale: Confocal Laser Scanning Microscopy (CLSM) and Environmental Scanning Electron Microscopy (ESEM)," Geol. Mag., 2003, vol. 140(4): pp. 469-478.

Norris et al., "SPE 22692: The Geological Modeling of Effective Permeability in Complex Heterolithic Facies," SEG 66th Annual Technical Conference and Exhibition, Oct. 1991: pp. 359-374.

O'Connor et al., "Microscale Flow Modelling in Geologic Materials", Physics and Chemistry of the Earth, Part A: Solid Earth and Geodesy, 1999, vol. 24(7): pp. 1-6.

Okabe et al., "Prediction of Permeability for Porous Media Reconstructed Using Multiple-Point Statistics", Physical Review E, 2004, vol. 70: pp. 066135-1-066135-10.

Okabe et al., "Pore Space Reconstruction Using Multiple-Point Statistics", Journal of Petroleum Science and Engineering, 2005, vol. 46: pp. 121-137.

Okabe et al., "Pore Space Reconstruction of Vuggy Carbonates Using Microtomography and Multiple-Point Statistics", Water Resources Research, 2007, vol. 43(12): pp. 1-5.

\* cited by examiner

PETROGRAPHIC IMAGE ANALYSIS FOR DETERMINING CAPILLARY PRESSURE IN POROUS MEDIA

CROSS-REFERENCE TO RELATED APPLICATIONS

This application claims benefit of U.S. Provisional Patent Application Ser. No. 61/447,434 filed on Feb. 28, 2011, entitled "Methods of using petrographic image analysis to determine capillary pressure in porous media."

This application is also related to commonly assigned U.S. patent application entitled "Method to build 3D digital models of porous media using transmitted laser scanning confocal microscopy and multi-point statistics," Ser. No. 12/459,414, filed on Jul. 1, 2009, U.S. patent application entitled "Method to quantify discrete pore shapes, volumes, and surface areas using confocal profilometry," Ser. No. 12/459,454, filed on Jul. 1, 2009, U.S. patent application entitled "Method for characterizing a geological formation traversed by a borehole," Ser. No. 12/384,945, filed Apr. 10, 2009, U.S. patent application entitled "Method to generate numerical pseudocores using borehole images, digital rock samples, and multi-point statistics," Ser. No. 12/384,721, filed Apr. 8, 2009, U.S. patent application entitled "Multiscale digital rock modeling for reservoir simulation," Ser. No. 13/036,770, filed Feb. 28, 2011, U.S. provisional patent application entitled "Method to determine representative element areas and volumes in porous media," Ser. No. 61/447,419, filed Feb. 28, 2011; and U.S. provisional patent application entitled "Methods to build 3D digital models of porous media using a combination of high- and low-resolution data and multi-point statistics," Ser. No. 61/447,417, filed Feb. 28, 2011, U.S. patent application entitled "Method to determine representative element areas and volumes in porous media," Ser. No. 13/407,542, filed herewith; and U.S. patent application entitled "Methods to build 3D digital models of porous media using a combination of high- and low-resolution data and multi-point statistics," Ser. No. 13/407,526, filed herewith. The content of each of the foregoing applications is incorporated herein by reference.

BACKGROUND

Properties obtained from Special Core AnaLysis (SCAL) provide an input to reservoir simulators. Such properties include pore-body and pore-throat size distributions, and capillary pressure curves. Pore-throat size distributions are generally computed from laboratory mercury injection capillary pressure (MICP) experiments. Under ideal conditions, mercury enters pores with the largest throats first, and fills these pores while the pressure is relatively constant. Pressure is sequentially increased to allow mercury to enter smaller and smaller pore throats and their attached pore bodies. MICP measurements are accurate, but they are slow, expensive, and they destroy the samples. Additionally, MICP measurements are not useful for pore throats larger than 100 microns because those throats are filled at low injection pressures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

According to some embodiments, a method for characterizing a sample of porous media including a plurality of pore bodies and a plurality of pore throats is described. The method includes preparing the sample of the porous media such that a single plane of the sample can be imaged; generating a two-dimensional high resolution image of the single plane of the prepared sample of the porous media; processing the high resolution image in part by carrying out a watershed image processing technique; identifying a plurality of pore throats based at least in part on the watershed technique; and determining a dimension associated with each of the identified plurality of pore throats.

According to some embodiments, the high resolution image is made using confocal microscopy, for example laser scanning fluorescence microscopy.

According to some embodiments, the porous media being characterized is a rock sample such as from a hydrocarbon bearing subterranean rock formation. According to some embodiments, the sample of porous media is prepared from a core sample into thin and/or thick slices, and subjected to vacuum-pressure impregnation with fluorescing epoxy.

According to some embodiments, pore-body and pore-throat size distributions and capillary pressure curves in the porous media are determined. The high resolution image can be pre-processed and enhanced, for example using stitching, registration, blending, clipping, and/or rotation. According to some embodiments, the image is segmented into grains and pores, thereby generating a binary image which is separated into a pores image and a throats image using one or more binary logical operations. The pores image and throats image are differentiated using one or more clustering algorithms thereby generating a clustered pores image and a clustered throats image, and pore-body and pore-throat size distributions are computed based on clustered images. The clustered pores image and throats image are subjected to data analysis wherein each pore body is assigned a diameter of a largest pore throat connected to the pore body, and each pore body has a known pore area, and pores having at least one connected throat are binned according to largest throat size, and pore-body size for each bin is computed and used to generate simulated capillary pressure curves using a Washburn equation.

According to some embodiments a system for characterizing a sample of porous media including a plurality of pore bodies and a plurality of pore throats is described. The system includes: a sample preparation system adapted to prepare a sample of the porous media such that a single plane of the sample can be imaged; an imaging system adapted to generate a two-dimensional high resolution image of a single plane of a prepared sample of the porous media; and a processing system adapted and programmed to process a generated two-dimensional high resolution image in part by carrying out a watershed image processing technique, to identify a plurality of pore throats based at least in part on the watershed technique; and to determine a dimension associated with each of the identified plurality of pore throats.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of embodiments of the subject disclosure, in which like reference numerals represent similar parts throughout the several views of the drawings, and wherein.

DETAILED DESCRIPTION

Figure 1:
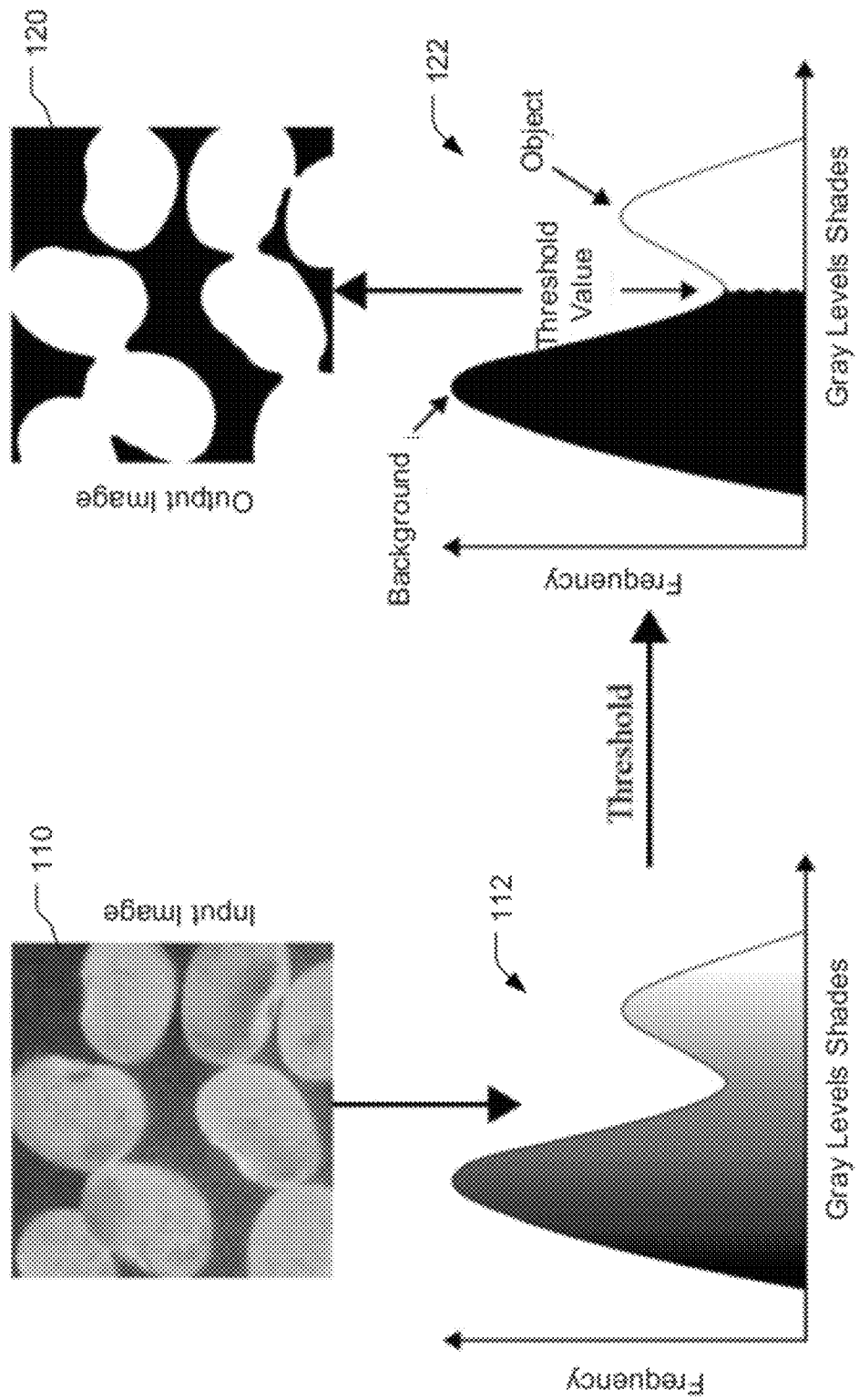
FIG. 1 depicts a thresholding (binarization) process.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details of the subject disclosure in more detail than is necessary for the fundamental understanding of the subject disclosure, the description taken with the drawings making apparent to those skilled in the art how the several forms of the subject disclosure may be embodied in practice. Further, like reference numbers and designations in the various drawings indicate like elements.

According to some embodiments, an integrated workflow is described to image, process, and generate pore-body and pore-throat size distributions and simulated capillary pressure curves for porous media, with pores as small as about 0.25 microns in size.

According to some embodiments, an automated petrographic image analysis system used to compute 2D and 3D pore-body and pore-throat size distributions is disclosed. The described methods can be applied to any porous media, although rocks are used as a non-limiting example. Examples of inputs include high-resolution petrographic images and laboratory-derived porosity measurements. Laser scanning fluorescence microscopy (LSFM) provides petrographic images in which pores are measured to a resolution of about 0.25 microns. Examples of outputs include: (1) pore-body and pore-throat size distributions, plotted as frequency histograms, cumulative frequency plots, and pore-volume fraction vs. pore-diameter plots, and (2) simulated capillary pressure curves for both pore bodies and pore throats. For validation, simulated capillary pressure results are compared to laboratory data.

To classify pore throats, an Expanding Flow Model (EFM) is introduced to show how fluids behave inside pores. This model identifies the largest attached pore throat as the one that controls flow in or out of a particular pore body. Pore throats are extracted using a novel image-analysis technique, based on watershedding algorithms and differences between processed images. Simulated capillary pressure is computed from the results. Representative element areas (REA) or volumes (REV), i.e., the smallest areas or volumes that can be imaged to capture heterogeneity within a sample are calculated. A semi-quantitative measurement of the error associated with numerical SCAL (Special Core Analysis) is determined by examining the quality of the image in terms of contrast, size of the image compared to the REA or REV, and an optional user-defined factor.

Definition of Pore Size.

Pore systems are made up of relatively large voids (pores) connected by smaller voids (pore throats). Pore-body size is generally measured as the diameter of the largest sphere that can fit in a pore, whereas pore-throat size is the diameter of the smallest disk or sphere that can be placed in the throats between pore bodies. Pore bodies and throats are commonly depicted as networks of spheres and tubes. In general, micropores are considered to be those with pore-body diameters of about 10 microns or less, and pore-throat diameters on the order of about 1 micron or less.

Pore-Size Distribution.

Carbonate rocks have pores that range in size over at least 9 orders of magnitude, from km-scale caves to submicron-scale voids. In contrast, sandstone pore sizes range over several orders of magnitude. Pore-size distributions are normally shown as histograms of frequency vs. pore radius or diameter. Radius is generally 2D, determined using various laboratory and image-analysis approaches. Examples of pore-size distribution determination methods include the following: core-slab photography, petrographic image analysis, mercury injection capillary pressure (MICP), constant rate mercury injection (CRMI or APEX), microCT scans, and nuclear magnetic resonance (NMR).

Core-slab photography is a technique that involves coating core slabs of carbonate rock with water-soluble, fluorescent paint. Photos taken under black light are processed using image-analysis software to determine 2D pore-size distributions. The smallest pores are generally 0.5 mm (500 microns) in size. The largest pores are cm-scale (tens of thousands of microns). See Hurley, N. F. Pantoja, D., and Zimmerman, R. A., 1999, "Flow unit determination in a vuggy dolomite reservoir," Dagger Draw Field, New Mexico: SPWLA Transactions, presented at the SPWLA 40th Annual Logging Symposium, Oslo, Norway and Hurley, N. F., Zimmermann, R. A., and Pantoja, D., 1998, "Quantification of vuggy porosity in a dolomite reservoir from borehole images and core," Dagger Draw Field, New Mexico: SPE 49323, presented at the SPE Annual Technical Conference and Exhibition, New Orleans, La., U.S.A.

Mercury Injection Capillary Pressure (MICP) involves progressive injection of mercury into a cleaned sample, commonly a core plug, at steadily increasing pressures. At each increased pressure level, pore throats of a particular size are invaded by mercury. Mercury invades the pore bodies connected to the outside of the core plug and pore throats of the size that are currently being invaded. Under ideal conditions, mercury enters pores with the largest throats first. Mercury fills these pores while the pressure is held relatively constant. After filling the pores that have a certain throat size, pressure is increased in order for the mercury to enter through smaller throats. This operation continues until the connected pores are filled. Note that isolated pores are not filled by mercury. Nano-scale throats could connect these seemingly isolated pores, but their percentage volume and their need for extremely high pressure may preclude them from contributing to the measured permeability of the rock. See Jennings, J., 1987, "Capillary pressure techniques: Application to exploration and development geology:" AAPG Bulletin, v. 71, No. 10, p. 1196-1209 and Pittman, E. D., 1992: "Relationship of porosity and permeability to various parameters derived from mercury injection-capillary pressure curves for sandstone:" AAPG Bulletin, v. 76, No. 2, p. 191-198.

Pore-throat size distributions are generally shown as histograms, computed from MICP results. Note that MICP is not useful for pore throats larger than 100 microns because those throats are filled at very low injection pressures. The ideal pore-throat size for MICP is 0.1 to 100 microns.

The Washburn equation (See Washburn, E. W., 1921, "The dynamics of capillary flow:" Physical Review, v. 17, No. 3, p. 273-283), which is the standard approach used to relate capillary pressure to throat size, assumes cylindrical throats:

$$P_c = \frac{-2\gamma\cos(\tau)}{d} \quad (1)$$

where $P_c$ is capillary pressure, d is throat diameter, $\gamma$ is interfacial tension and T is contact angle. For the air-mercury system at room temperature, $\gamma$=480 dynes/cm and T=140°. Using these constants, with d in microns and $P_c$ in psi, the equation becomes:

$$P_c = \frac{214}{d} \quad (2)$$

The Thomeer hyperbolic fit (See Thomeer, J. H. M., 1960, "Introduction of a pore geometrical factor defined by the capillary pressure curve:" Journal of Petroleum Technology, v. 12, No. 3, p. 73-77 (hereinafter "Thomeer 1960")) assumes that capillary pressure data lie on a hyperbola given by Equation 3 when the data are plotted on a log-log scale. This model provides a convenient way to think about capillary pressure curves. Bimodal or more complex pore systems can be analyzed by fitting more than one Thomeer hyperbola to the curve (e.g., See Clerke, E. A., Mueller, H. W. III, Phillips, E. C., Eyvazzadeh, R. Y., Jones, D. H., Ramamoorthy, R., and Srivastava, A., 2008: "Application of Thomeer hyperbolas to decode the pore systems, facies and reservoir properties of the upper Jurassic Arab D limestone, Ghawar field, Saudi Arabia: A "Rosetta Stone" approach:" GeoArabia, v. 13, p. 113-116). The equation is:

$$\log(e^{-G}) = \log\left(\frac{B_v}{B_\infty}\right) \times \log\left(\frac{P_c}{P_d}\right) \quad (3)$$

where G is the shape factor, $B_v$ is the cumulative bulk percentage, $B_\infty$ is the maximum mercury bulk percentage reached, $P_c$ is the capillary pressure and $P_d$ is the entry pressure, i.e., the pressure when mercury enters the largest throat.

Thus, the Thomeer hyperbola is controlled by three main parameters: G, $B_\infty$, and $P_d$. G controls the shape of the hyperbola, whereas $P_d$ and $B_\infty$ control the location of the x and y asymptotes, respectively. Examining a typical capillary pressure curve shows that Thomeer hyperbola diverge from the measured curve if there are large pores. This occurs because measured data have a large error at low pressures because of surface irregularities. The 'closure correction' is applied to correct for large pores. The Thomeer hyperbola is used to obtain realistic entry pressure values ($P_d$).

Constant Rate Mercury Injection (CRMI or APEX) is a technique that maintains a constant injection rate and monitors fluctuations of injection pressure. See Yuan, H. H., and Swanson, B. F., "Resolving pore-space characteristics by rate-controlled porosimetry": SPE Formation Evaluation, v. 4, No. 1, p. 17-24. The injection rate is kept extremely low so that pressure loss due to flow inside the sample is negligible compared to the capillary pressure. In this case, the observation of a sudden pressure drop is the result of the movement of mercury from pore throats into pore bodies, and is accompanied by mercury instantaneously filling the pore bodies. The further rise of injection pressure corresponds to the filling of pore throats that have smaller radius. The volume of pore bodies can be determined from the injection rate and the time it takes to fill the pore bodies. This method provides size distributions of pore bodies and pore throats. It cannot, however, get to the same high pressures as conventional MICP. Its maximum pressure is a few thousand psi Hg-air and shows details of the larger pores.

Micro-CT scans is a technique that uses x-ray computed tomography (CT) on small samples (commonly 5-mm diameter core plugs) to detect pore bodies that are 3 microns and larger in size. Software converts physical pore images into pore-network models, with their resulting pore-body and pore-throat size distributions. See Knackstedt, M. A., Arns, C. H., Sakellariou, A., Senden, T. J., Sheppard, A. P., Sok, R. M., Pinczewski, W. V., and Bunn, G. F., 2004, "Digital core laboratory: Properties of reservoir core derived from 3d images:" SPE Preprint 87009, Presented at the Asia-Pacific Conference on Integrated Modelling for Asset Management, March 29-30.

Nuclear Magnetic Resonance (NMR) is a technique is based on the interaction of hydrogen nuclei (protons) with a magnetic field and pulses of radio-frequency signals. See Coates, G. R., Xiao, L., and Prammer, M. G., 1999, "NMR Logging: Principles and Applications:" Gulf Publishing Company, Houston, Tex., 233 p. The NMR transverse relaxation time distribution ($T\_2$ distribution) is mostly related to pore-size distribution in the rock, although transverse relaxation is also related to factors such as surface relaxivity and fluid type. Research has shown that grain-surface relaxation has the most influence on $T\_2$ relaxation times for rocks. Surface relaxivity ($\rho$) is a measure of the ability of grain surfaces to cause nuclear-spin relaxation. Different rocks have different surface-relaxivity characteristics. The rate of proton grain-surface relaxation depends on how often protons collide with or get close enough to interact with grain surfaces. As a result, the surface to volume (SN) ratio of rock pores influences NMR relaxation times. For spherical pores, SN is proportional to the inverse of the pore radius. Larger pores have relatively smaller SN ratios and proportionally longer relaxation times. Smaller pores have relatively larger SN ratios, resulting in shorter relaxation times. NMR surface relaxivity is characterized by the following equations:

$$\left(\frac{1}{T_2}\right)_s = \rho \frac{S}{V} \text{ and } \left(\frac{1}{T_2}\right)_s = \rho_e r \qquad (4)$$

where $\rho$ is surface relaxivity in units of $\mu m/s$, S is surface area ($\mu m^2$), V is volume ($\mu m^3$), $\rho_e$ is effective relaxivity ($\mu m/s$), and r is radius ($\mu m$). Thus, we can obtain pore-size distribution information from NMR $T_2$ distributions.

Laser scanning fluorescence microscopy (LSFM) provides a high-resolution (about 0.25 micron) technique to build 3D digital rock models. Confocal and multiphoton techniques are most common, although the emerging field of super-resolution fluorescence microscopy may provide improved images of rocks and other porous media, down to a few nm to 10's of nm in scale. See Huang, B., Bates, M., and Zhuang, X., 2009, "Super-resolution fluorescence microscopy:" Annual Review of Biochemistry, v. 78, p. 993-1016. Such techniques enhance the resolution of fluorescence microscopy using patterned excitation or single molecule localization of fluorescence.

Confocal microscopy, the most common type of LSFM, uses point illumination and a pinhole placed in front of a detector to remove out-of-focus light. Because each measurement is a single point, confocal devices perform scans along grids of parallel lines to provide 2D images of sequential planes at specified depths within a sample.

Depth of penetration of LSFM is limited because reflected light is absorbed and scattered by material above the focal plane. Experiments have successfully imaged depths as great as 500 microns using pore casts of carbonate rocks, where the rock material has been removed with acid. Fortunately, areal coverage is not limited because tiled scans can be made of relatively large areas (10's of $mm^2$) of polished sections of rock.

Multiphoton microscopy uses two-photon excitation to image living tissue to a very high depth, about one millimeter. See Wikipedia website http://en.wikipedia.org/wiki/Two-photon_excitation_microscopy, accessed on Oct. 23, 2010. Like confocal microscopy, this technique excites fluorescent dyes injected into rocks. "The principal is based on the idea that two photons of comparably lower energy than needed for one photon excitation can also excite a fluorophore in one quantum event. Each photon carries approximately half the energy needed to excite the molecule. An excitation results in the subsequent emission of a fluorescence photon, in general at a higher energy than either of the two excitatory photons." Resolution is diffraction-limited to about 250-nm, similar to confocal microscopy. Confocal and multiphoton microscopy are widely used in the life sciences and semiconductor industries.

Representative element volumes (REV) provide a way to deal with heterogeneity and upscaling issues in reservoir modeling. See "Qi, D., 2009, "Upscaling theory and application techniques for reservoir simulation:" Lambert Academic Publishing, Saarbrucken, Germany, 244 p" (hereinafter "Qi 2009"). In summary, REV is the smallest volume that can be modeled to yield consistent results, within acceptable limits of variance of a modeled property, such as porosity. Using this approach, we can upscale rock properties from fine to coarse scales. We determine the smallest volume to be modeled, run the flow model, and use the results in the next larger-scale simulations. Once we have modeled an REV, we do not need to model larger volumes because we have captured heterogeneity for that particular rock type at that scale.

The concept of REV was discussed in 1972. See "Bear, J., 1972, "Dynamics of fluids in porous media:" Elsevier, N.Y., 746 p" (hereinafter "Bear 1972"). Bear defined AU, as a volume in a porous media, with a centroid of P. AU, is considered to be much larger than a single pore or grain. $\Delta U_i$ is the volume of void space, and $n_i$ is the ratio of void space to volume, i.e., the fractional porosity. At large values of $\Delta U_i$ there are minimal fluctuations of porosity as a function of volume. However, as volume decreases, fluctuations in porosity increase, especially as AU, approaches the size of a single pore, which has fractional porosity of 1. If the centroid P happens to lie in a grain, porosity is 0 when $\Delta U_i = 0$. The value $AU_o$ is defined as the REV, below which fluctuations of porosity are significant, and above which fluctuations of porosity are minimal. In brief, the dimensions of $\Delta U_o$ are sufficient so that "the effect of adding or subtracting one or several pores has no significant influence on the value of n" (Bear, 1972).

Using the REV approach, the porous medium is replaced by "a fictitious continuum: a structureless substance, to any point of which we can assign kinematic and dynamic variables and parameters that are continuous functions of the spatial coordinates of the point and of time" (Bear, 1972). Note that the REV for porosity may differ from the REV for permeability or other parameters. Also, the REV for static vs. dynamic properties may vary. In practice, the best method is to use the largest REV determined using various approaches.

Many reservoir engineers have heard rocks, especially carbonates, described as "so heterogeneous, they are homogeneous." Fundamentally, this is a statement about RSV's. Below a certain sample size, rocks are heterogeneous and there is considerable dispersion or variance in rock properties (for example, see "Greder, H. N., Biver, P. Y., Danquigny, J., and Pellerin, F. M., 1996, "Determination of permeability distribution at log scale in vuggy carbonates:" Paper BB, SPWLA 37th Annual Logging Symposium, June 16-19, 14 p"). Above a certain sample size, dispersion is reduced to an acceptable level, and this sample size is the REV.

An analogous term for REV in 2D, which is REA (representative element area) was defined. See "Norris, R. J., and Lewis, J. J. M., 1991, "The geological modeling of effective permeability in complex heterolithic facies:" SPE Preprint 22692, Presented at the 66th Annual Technical Conference and Exhibition, Dallas, Tex., October 6-9, p. 359-374" (hereinafter "Norris 1991"). Norris 1991 applied the concept to modeling of effective permeability from scanned outcrop photos in heterolithic rocks. Basically, REA is the smallest area of a rock that is representative of the measured rock property. REA and REV measure area and volume, respectively. Both terms allow us to capture heterogeneity in rock properties.

REA is determined using an iterative process, whereby variance in a given parameter, such as porosity, is measured for successively larger sample areas. REA is the area where the standard deviation of the variance from the sample mean is zero, or an acceptably low value. Sample mean is laboratory-derived core-analysis porosity.

Digital Image Analysis.

Digital images can be thought of as a matrix of numbers, with each number representing a pixel. In an 8-bit image, each pixel has a value between 0 and 255 (i.e., 256 or 28 gray shades). Images can also be 16-bit, 24-bit and so on. Note that RGB images can be thought of as three matrices with one matrix for each of the red, green, and blue colors.

A binary image is an image in which the pixels consist of two numbers, commonly 0 for black, and 255 for white. Background vs. foreground color is arbitrary. For example, in a rock sample, grains can be white and pores can be black, or vice versa. The process by which a grayscale or RGB image is converted to a binary image is called thresholding or binarization.

Two fundamentally different types of image processing techniques are used in this subject disclosure: (1) grayscale image processing, and (2) binary image processing (a.k.a. morphological image processing). Each process operates at its own scale. Some processes perform operations on the pixel scale, whereas others are applied to a block with a size called the kernel size (e.g., 3×3 pixel size). Results, in this case, are returned to the central pixel.

Grayscale image processing is used in the subject disclosure for image enhancement and restoration. Processes used include: (1) unsharp mask (USM), (2) contrast limited adaptive histogram equalization (CLAHE), and (3) thresholding.

Unsharp mask (USM), in contrast to what its name may imply, is a filter used to sharpen the image by subtracting a blurred version from the original image. Blurring the image can be done in several ways. The common procedure is to apply a Gaussian blur. After subtraction, the image is then equalized back to its original histogram. The radius of the Gaussian blur filter and its weight are defined. USM can be implemented in an indiscriminating way on the pixels, or in a discriminating way. A threshold that defines the minimum contrast between pixels can be used to test whether to apply the USM mask. A threshold is normally used to minimize artificial noise created from the indiscriminating USM.

Contrast limited adaptive histogram equalization (CLAHE), modified by Zuiderveld, K., 1994, "Contrast limited adaptive histograph equalization," in Heckbert, P. S., Graphic Gems IV, San Diego: Academic Press Professional, p. 474-485 from the Adaptive Histogram Equalization of Pizer, S. M., Amburn, E. P., Austin, J. D., Cromartie, R., Geselowitz, A., Greer, T., Romeny, B. T. H., Zimmerman, J. B., and Zuiderveld, K., 1987, "Adaptive histogram equalization and its variations:" Computer Vision, Graphics and Image Processing, v. 39, No. 3, p. 355-368 is a process that is commonly applied to correct uneven illumination. While standard histogram equalization operates on the entire image, CLAHE operates on a local scale by equalizing contrast to a user-specified distribution. The kernel size defines the size of this local scale. Bilinear smoothing is applied between each local area to produce seamless transitions. CLAHE is most commonly used in the medical industry to enhance x-rays and microscopic images. CLAHE minimizes artificial noise, which is its main advantage over standard global normalizing algorithms.

Thresholding (binarization) is a process by which a digital integer image (8-bit, 16-bit, etc.) is converted into a binary image. FIG. 1 depicts a thresholding (binarization) process. The histogram 112 of input image 110 is divided into two parts: the background with a value of 0 and the elements (foreground) with a value of 255. Input image 110 is modified from an image from Wikipedia, 2010, http://en.wikipedia.org/wiki/Thresholding_(imageprocessing), accessed Oct. 31, 2010. Thresholding is applied by assigning a black value for any pixel lower than the threshold value and a white pixel for any that is higher. A number of algorithms exist for automatic detection of the best threshold value. See Sahoo, P. K., Soltani, S., Wong, A. K. C., and Chen, Y. C., 1988, "A survey of thresholding techniques:" Computer Vision, Graphics, and Image Processing, v. 41, No. 2, p. 233-260 and Sezgin, M., and Sankur, B., 2004, "Survey over image thresholding techniques and quantitative performance evaluation:" Journal of Electronic Imaging, v. 13, No. 1, p. 146-165. The choice between algorithms depends on the type of use. In FIG. 1, the resultant histogram 122 shows the threshold value with the former gray level shades below the threshold being assigned a value of 0 and the former gray level shades above the threshold being assigned a value of 255. The output image 120 is also shown. Note that the example of FIG. 1 where the histogram has two distinct humps or peaks, the threshold value was selected between the two peaks.

Morphological image processing operates on binary images, and the ultimate goal is to obtain measurements. Processes used in the subject disclosure include: (1) Kuwahara edge-preserving filter, (2) logical operators, (3) the watershed transform, (4) clustering algorithms, and (5) measurement calculations.

The Kuwahara edge smoothing filter (Kuwahara, M., Hachimura, K., Eiho, S., and Kinoshita, M., 1976, "Digital processing of biomedical images:" Plenum Press, p. 187-203) is a non-linear noise reduction filter that attempts to preserve edges. The filter calculates the variance and average intensity of 4 overlapping subregions for each pixel. The average of the part with the least variance is returned to the central pixel. Several variations on the filter, using the same theme, have been introduced since it was first developed. See Papari, G., Petkov, N., and Campisi, P., 2007, "Artistic edge and corner enhancing smoothing:" IEEE Transactions on Image Processing, v. 16, No. 10, p. 2449-2462 and Kyprianidis, J. E., Kang, H., and Donner, J., 2009, "Image and video abstraction by anisotropic Kuwahara filtering:" Computer Graphics Forum, v. 28, No. 7, p. 1955-1963.

Logical operators are operators that can be applied using two images. For example, an AND logical operator would produce a white pixel if and only if input images have white pixels in the same location. An OR logical operator would produce a white pixel if a white pixel exists in either of the input images at that location.

The watershed transform is an operation that attempts to find and separate different elements in the image. This transform works best with elliptical and circular objects. Many algorithms exist to perform such operations and most can be classified into one of two very broad categories: (1) immersion, and (2) topographical distance algorithms. Roerdink, J. B. T. M., and Meijster, A, 2000, "The watershed transform:" Definitions, algorithms and parallelization strategies: Fundamenta Informaticae, v. 41, p. 187-228 wrote a comprehensive review of watershedding. Immersion algorithms, as in Vincent, L., and Soille, P., 1991, "Watersheds in digital spaces: An efficient algorithm based on immersion simulations:" IEEE Transactions on Pattern Analysis and Machine Intelligence, v. 13, No. 6, p. 583-598, simulate flooding of basins of the distance map of the binary image. A distance map assigns numerical values to each pixel based on the minimum distance to background pixels. A pixel at the center of a pore has a relatively high value. If one takes the inverse of the distance map, 'basins' are created instead of 'mountains.' Water flooding is then simulated by a region growing until two basins begin to overlap. At that point, the algorithm stops and a watershed line is created. Topographical algorithms attempt to minimize the distance between the object center and the watershed lines.

Figure 2:
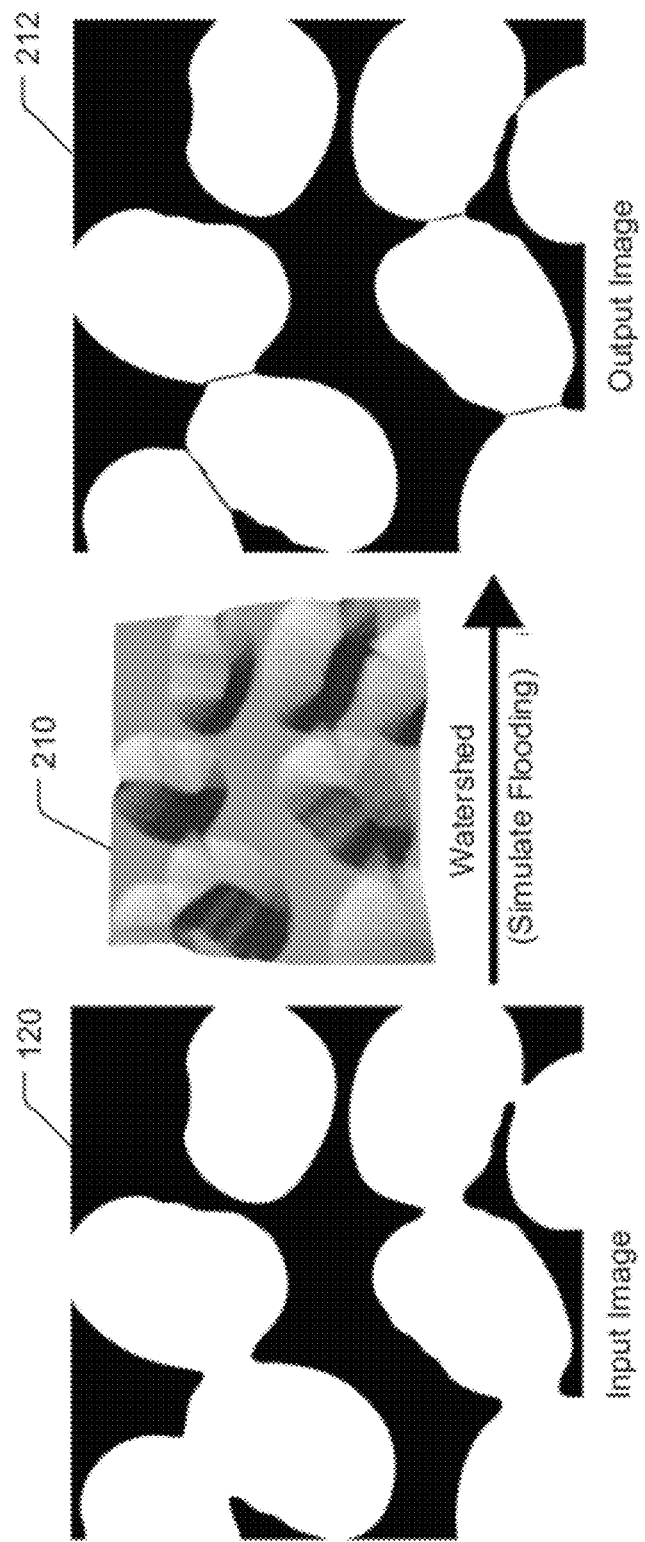
FIG. 2 depicts a watershed example using the output image of FIG. 1, according to some embodiments.

FIG. 2 depicts a watershed example using the output image of FIG. 1, according to some embodiments. The input image 120 is shown, in this case after thresholding. The immersion-based watershed transform separates different catchment basins in the image. This flooding is simulated on the distance map 210 to yield the output image 212 which has separations as shown.

Figure 3:
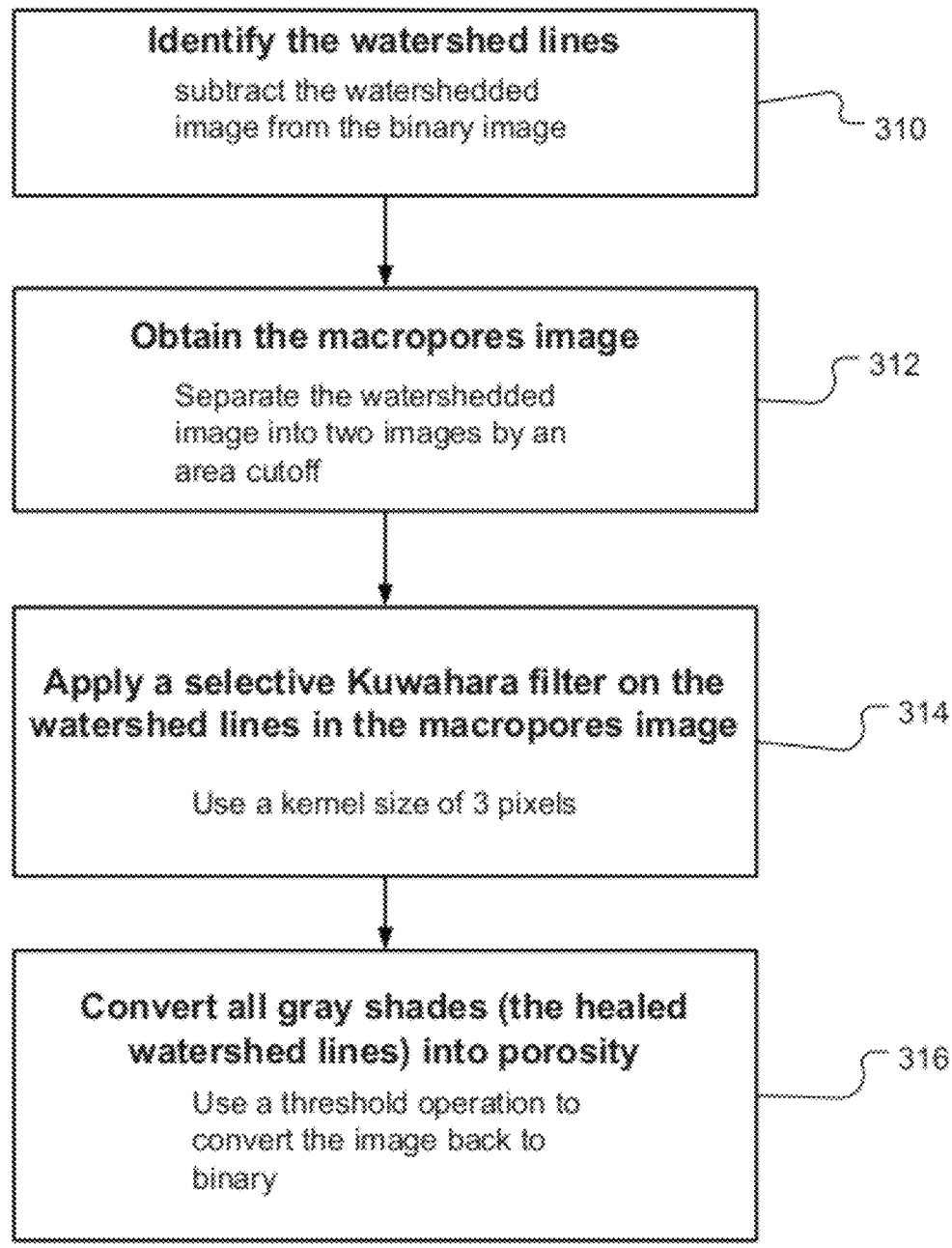
FIG. 3 depicts a flow chart of a selective Kuwahara filter procedure for "healing" large pores, according to some embodiments.

FIG. 3 depicts a flow chart of a selective Kuwahara filter procedure for "healing" large pores, according to some embodiments. In block 310, the watershed lines are identified by subtracting the watershedded image from the binary image (e.g., subtracting image 120 from the image 212). In block 312, the macropores image is obtained by separating the watershedded image into two images by an area cutoff. In block 314, the Kuwahara filter is implemented on a binary image to attempt to restore large segmented pores into their original state, i.e., before segmentation and after watershedding. Because the watershed line is relatively small in width (1 or 2 pixels maximum), the 5×5 Kuwahara filter will fill the watershed line with a gray shade. In block 316, the gray shades can then be converted back to porosity. Note that the watershed lines in microporosity will not be restored because the image used is the macropore image. The Kuwahara filter is applied to the watershed-line pixels.

The cutoff for what is considered to be a large pore arises from the procedure depicted in FIG. 3. This cutoff is related to the watershedding algorithm used as well as the definition of micro- and macroporosity. A smaller cutoff should be used for algorithms that over-segment pores. It has been found that a cutoff of 50 microns pore-body diameter is suitable for the watershed algorithm used in ImageJ. Finding the most suitable cutoff, if it is needed, should be part of the calibration process of the system.

Figure 4:
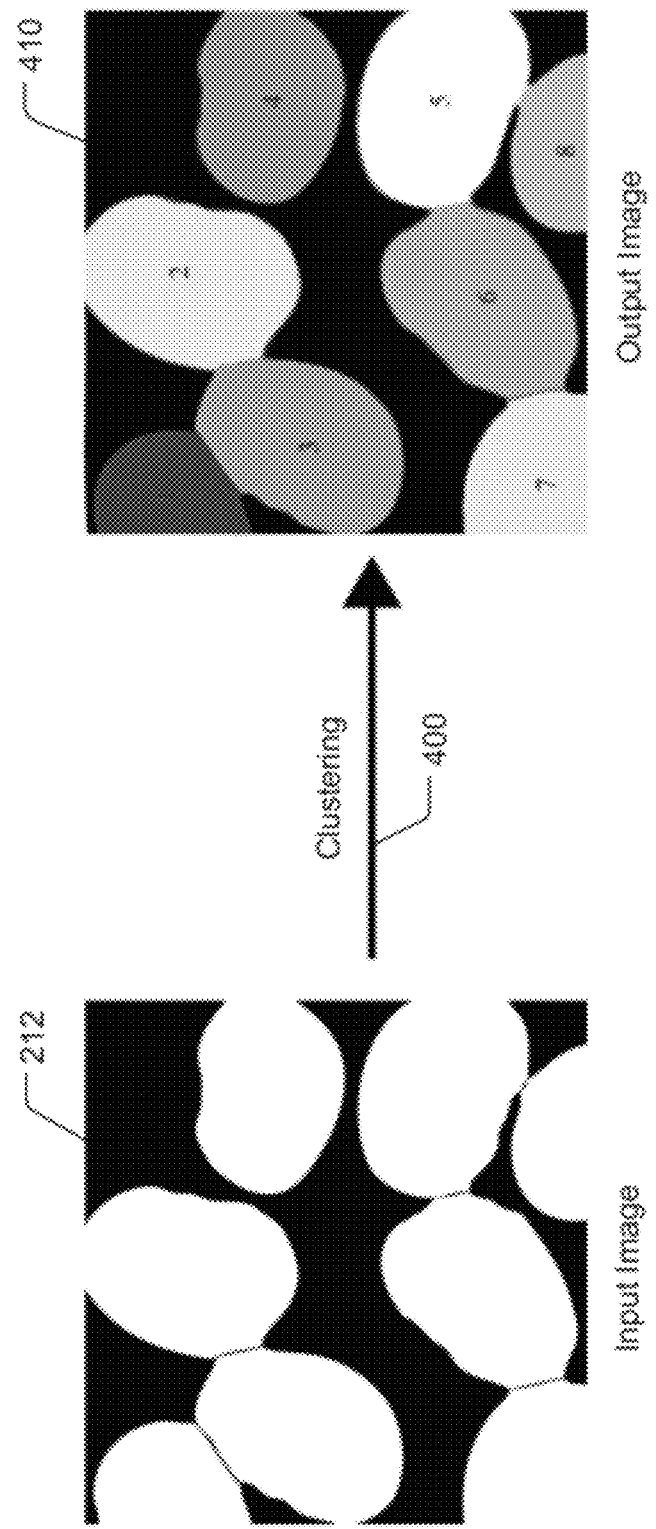
FIG. 4 depicts an example of a clustering algorithm, according to some embodiments.

FIG. 4 depicts an example of a clustering algorithm, according to some embodiments. A clustering algorithm labels each element in the image by a unique identifier. As a result, masking, measurements, and other types of operations can be applied to each element. In FIG. 4, input image 212 and output image 410 are shown for a clustering algorithm 400. Two dimensional clustering can be 4-connected or 8-connected. 4-connected clustering considers pixels that are connected diagonally as two separate elements, whereas 8-connected clustering considers them as one element. A simple algorithm would scan the image pixel by pixel and assign a label for each pixel depending on its neighbors. If no neighbors were found, a new label is created. See Hoshen, J., and Kopelman, R., 1976, "Percolation and cluster distribution—I. Cluster multiple labeling technique and critical concentration algorithm:" Physical Review B, v. 14, No. 8, p. 3438-3445. Another scan is used to merge connected labels.

Finally, different types of measurements can be done on binary images. Masking of individual elements can be applied, and area, perimeter, best elliptical fit, orientation, and other measurements can be calculated.

Figure 5:
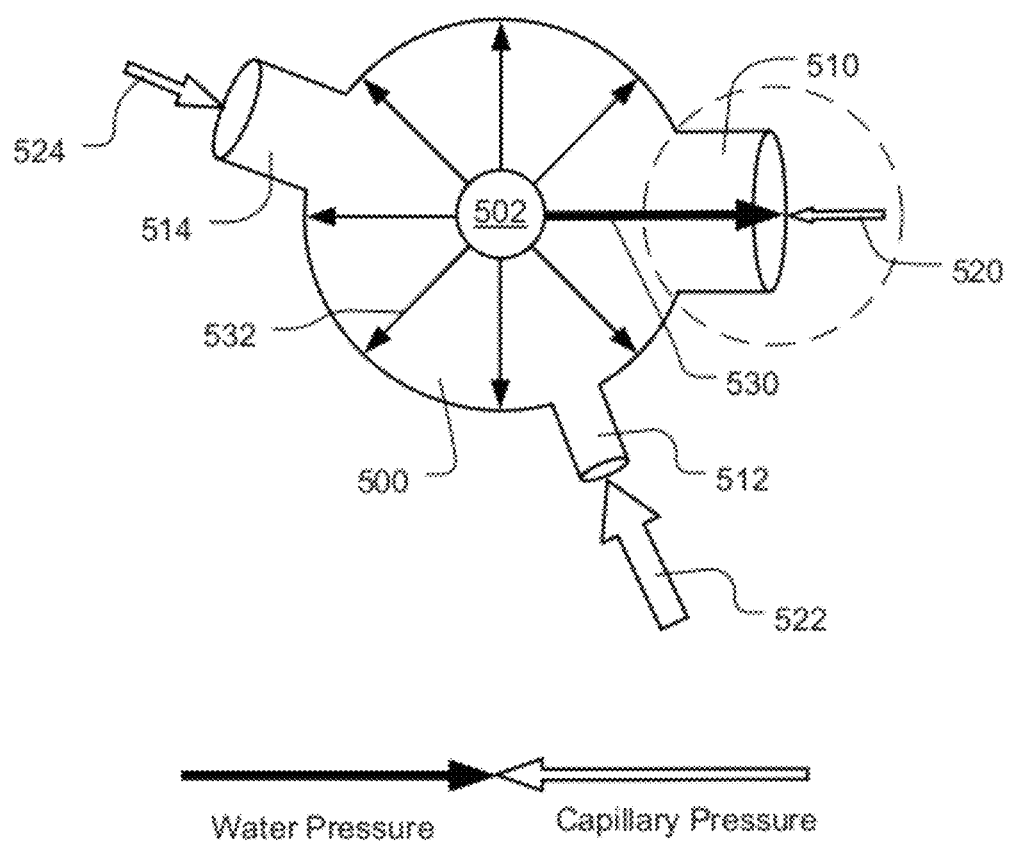
FIG. 5 depicts an Expanding Flow Model (EFM) used to understand capillary pressure, according to some embodiments

FIG. 5 depicts an Expanding Flow Model (EFM) used to understand capillary pressure, according to some embodiments. Capillary pressure is shown in white arrows, such as arrows 520, 522 and 524, and the opposing water pressure is shown with solid arrows such as arrows 530 and 532 for an individual pore 500. Pore 500 in this example has three throats 510, 512 and 514. Note that the largest throat 510 has the smallest capillary pressure 520, therefore, fluid tends to exit from throat 510;

EFM treats each pore and its throats as individual elements. From this view, the centroid of each pore is the source of the fluid, such as source 502 of pore 500. Pressure, i.e., capillary pressure, exists in throats and is proportional to the inverse of their diameter. For fluid to escape from a pore, a certain pressure, equal to the capillary pressure or larger, inside the pore has to be reached. Note that the minimum capillary pressure (520) exists around the largest throat (510) and thus the fluid starts to escape from that throat first. As the fluid escapes, the pressure does not increase in the pore. According to some embodiments, using EFM the largest throat size for each pore is considered when calculating capillary pressure. Smaller throats can be assumed not to transmit fluid unless the pressure has risen instantaneously to their capillary pressure or other larger throat paths have been filled with fluid. It has been found that for a well-connected pore network, this does not happen often.

Given two pores with two different throat sizes, fluid will enter the pore with the largest throat first. This assumption is not valid if the fluid has to go through the pore with the smaller throat first in order to reach the pore with the largest throat.

Figure 6:
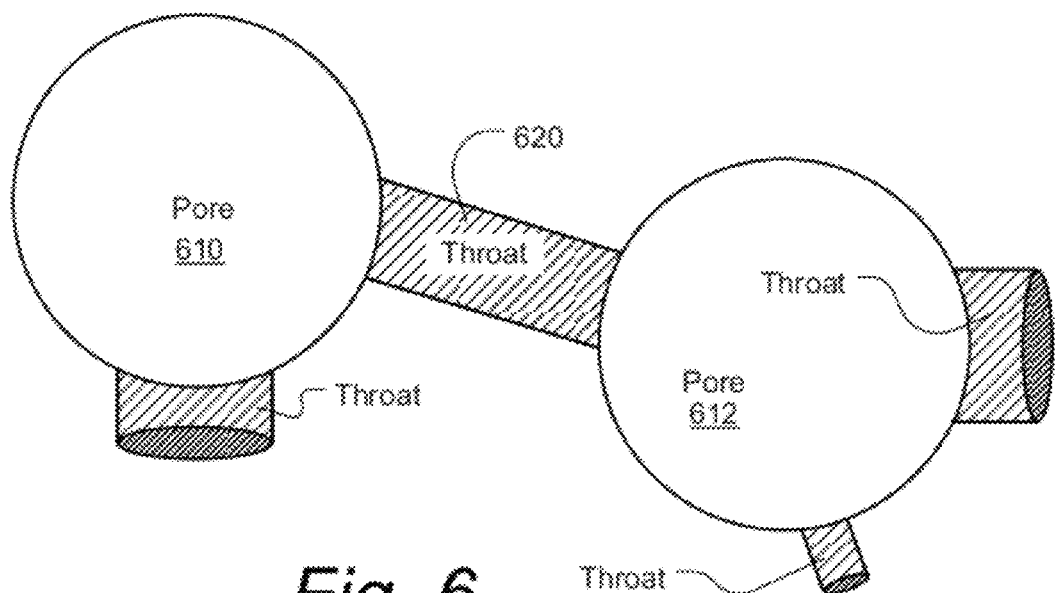
FIGS. 6 and 7 depict two views of pores and throats, according to some embodiments.
Figure 7:
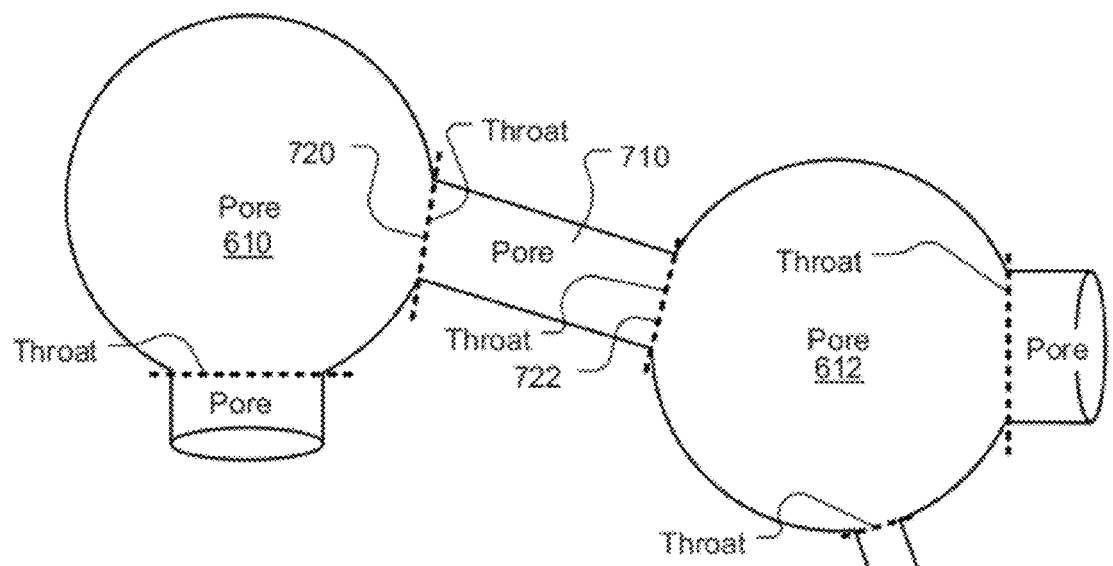

FIGS. 6 and 7 depict two views of pores and throats, according to some embodiments. FIG. 6 depicts a more conventional stick and ball view, wherein pores such as pores 610 and 612 are connected by throats such as throat 620. The model of FIG. 7, in contrast considers throats as lines of local minima of diameter connecting pores. As can be seen pores 610 and 612 are connected by a smaller pore 710, and there is a throat 720 connecting pore 610 and pore 710, and a throat 722 connecting pore 710 to pore 612. Thus, in the EFM model, a throat in the traditional view translates into two throats that are connected to a small pore. The EFM view shown in FIG. 7 is more realistic in terms of physics, because a pore and a throat are fundamentally two different entities. In contrast to the view of FIG. 6, a throat in the EFM view can never be a pore because it is a line in 2D or a plane in 3D.

Figure 8:
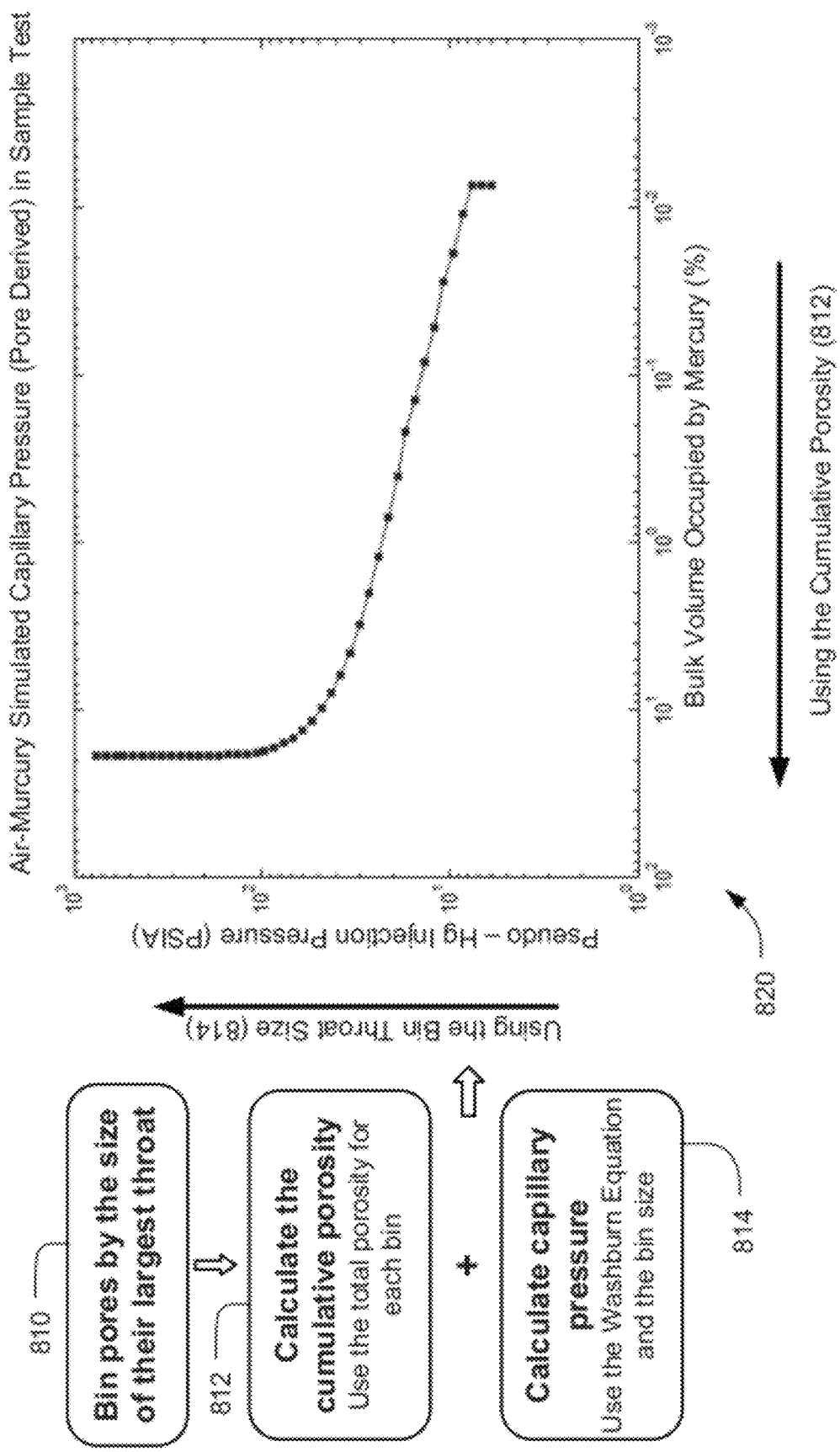
FIG. 8 depicts a numerical capillary pressure calculation workflow based on the EFM model, according to some embodiments.

FIG. 8 depicts a numerical capillary pressure calculation workflow based on the EFM model, according to some embodiments. In block 810, the pores are binned by the size of their largest throat. The largest pore throat attached to each pore body can be determined using image analysis to determine port-throat sizes. This value is used to characterize that pore body in the simulated capillary pressure curves made for pore throats. In block 812, the cumulative porosity is calculated using the total porosity for each bin. In block 814, the capillary pressure is calculated using the Washburn equation (equation 1) and the bin size. The plot 820 shows an example of the simulated capillary pressure curve.

Properties obtained from Special Core AnaLysis (SCAL) provide an input to reservoir simulators. Such properties include pore-body and pore-throat size distributions, and capillary pressure curves. Pore-throat size distributions can be computed from laboratory mercury injection capillary pressure (MICP) experiments.

Petrographic image analysis provides another means to obtain SCAL measurements. With advances in computers during the last decade, hundreds of millions of pixels can be analyzed in minutes to hours. Advances in microscopy have enabled us to acquire fast, high-resolution images over large areas (many mm2) of a thin section. Combined with new techniques described herein, accurate estimation of SCAL measurements are obtained, according to some embodiments. The example approach described herein is to estimate numerical rock properties based on calculations taken directly from petrographic images, which are used to compute pore-body and pore-throat size distributions and simulated capillary pressure curves.

Figure 9:
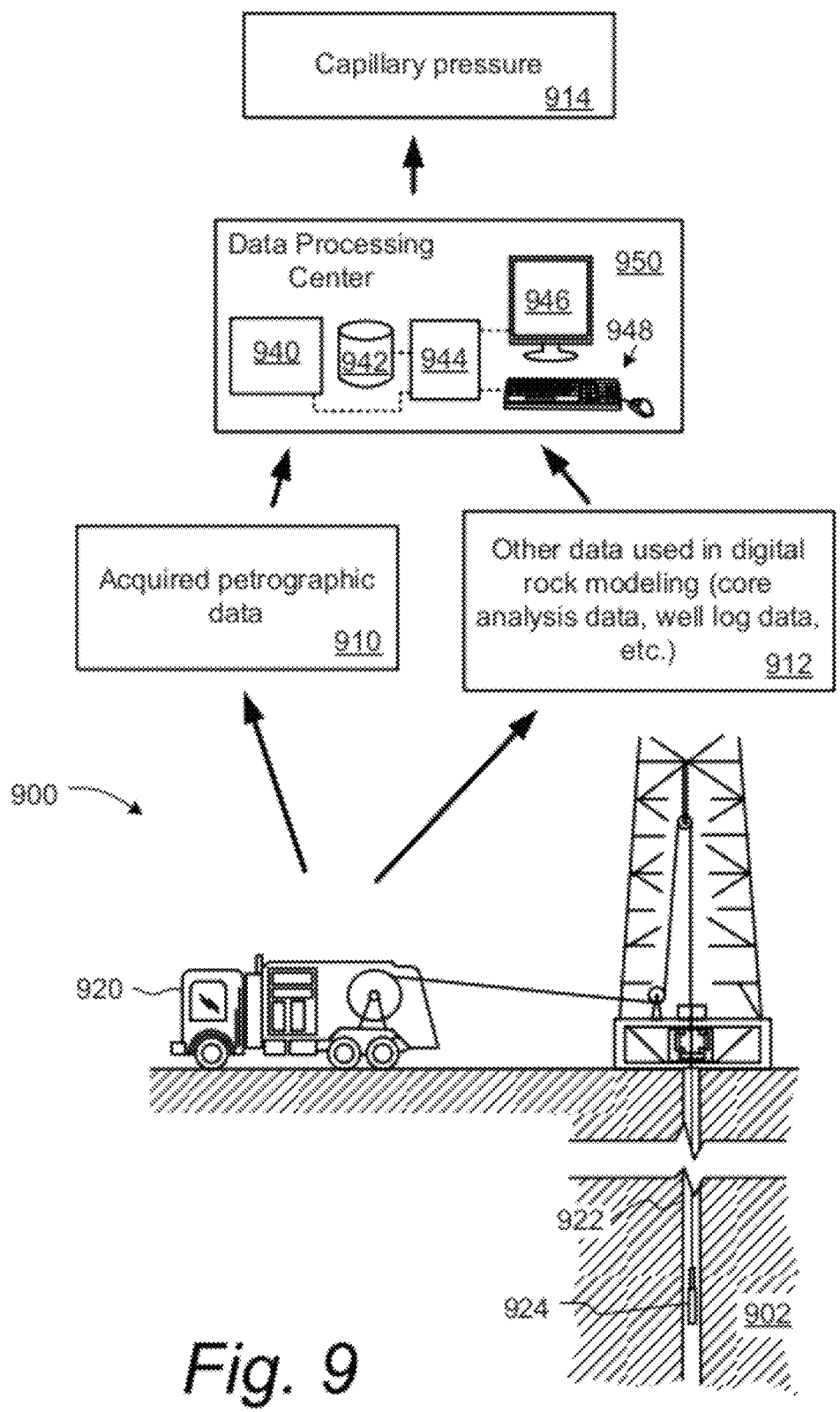
FIG. 9 shows systems to determine pore-body and pore-throat size distributions, and simulated capillary pressure curves from petrographic data, according to some embodiments.

FIG. 9 shows systems to determine pore-body and pore-throat size distributions, and simulated capillary pressure curves from petrographic data, according to some embodiments. Acquired petrographic data 910 (such as digital rock images) are transmitted to a processing center 950 which includes one or more central processing units 944 for carrying out the data processing procedures as described herein, as well as other processing. The processing center includes a storage system 942, communications and input/output modules 940, a user display 946 and a user input system 948. According to some embodiments, the processing center 950 may be located in a location remote from the acquisition site of the petrographic data. The processing center receives many other types of data 912 used in digital rock modeling, such as core analysis data and well log data. In FIG. 9 data and/or samples from a subterranean porous formation 902 is being gathered at wellsite 900 via a wireline truck 920 deploying a wireline tool 924 in well 922. According to some embodiments, wireline tool 924 includes a core sampling tool to gather one or more core samples from the porous formation 902. One of the outputs of the processing center is the capillary pressure 914 as shown. Although the system in FIG. 9 is shown applied to the example of digital rock images of a subterranean porous formation, in general the described techniques can be applied to any porous media.

Figure 10:
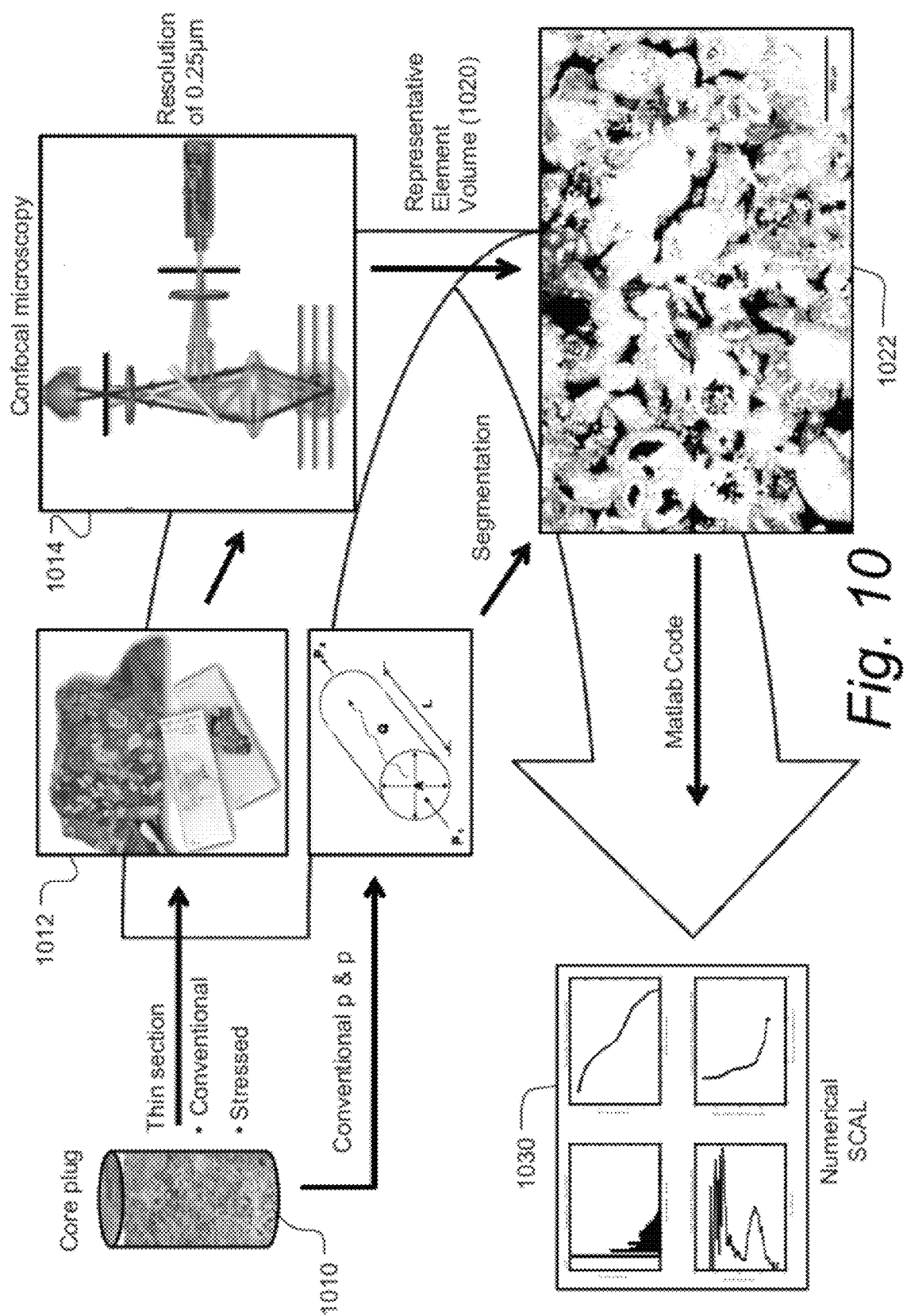
FIG. 10 depicts a workflow of the methods described to determine pore-body distribution, pore-throat distribution, and capillary pressure, according to some embodiments.

FIG. 10 depicts a workflow of the methods described to determine pore-body distribution, pore-throat distribution, and capillary pressure, according to some embodiments. From a core plug 1010, thin sections 1012 are prepared, which are then imaged using a high-resolution microscope (such as confocal microscope 1014). Porosity and permeability (p & p) can be used on the core plug 1010 to segment the image into a binary image of grains and pores. The image is analyzed and a representative element area (or volume) 1020 is calculated. The image is segmented into pores and grains using the laboratory-measured porosity value (segmented image 1022). Using methods of the subject disclosure, pore-body size distribution, pore-throat size distribution (numerical SCAL 1030), and capillary pressure are obtained, for example using Matlab code.

According to some embodiments, procedures are disclosed for determining pore-body and pore-throat size distributions, and simulated capillary pressure curves. The procedures can be applied to any porous media, although in some examples described herein it is applied to digital rock images.

Figure 11:
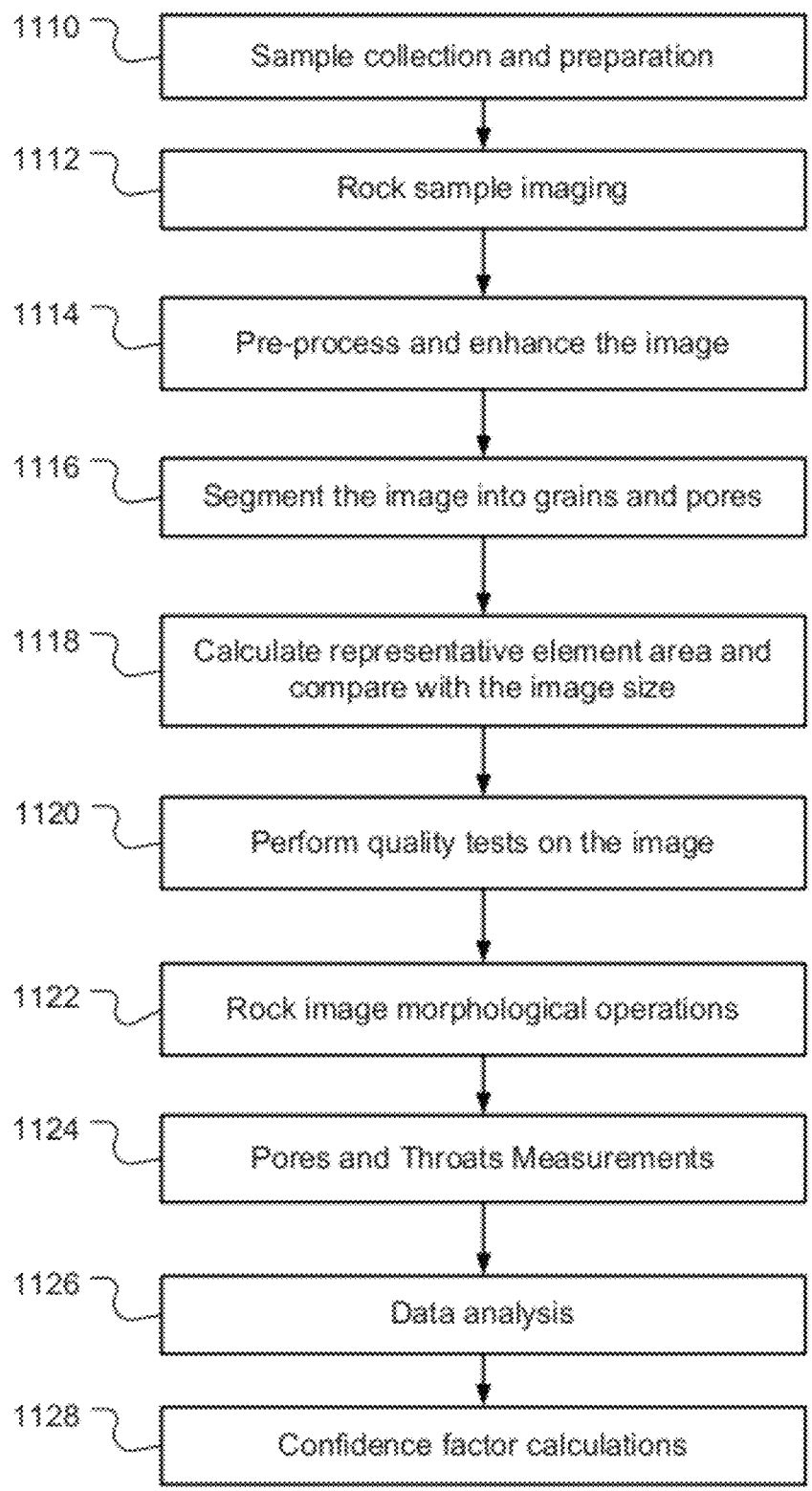
FIG. 11 is a flow chart illustrating a 2D workflow according to some embodiments.

FIG. 11 is a flow chart illustrating a 2D workflow according to some embodiments. In block 1110, a sample is collected and prepared. The goal of this phase is to prepare the sample for imaging. The system described herein uses high-resolution microscopic images. Any high-resolution grayscale images are sufficient. Sample preparation depends on the type of microscope used. According to some embodiments, a confocal microscope is used with standard thin sections (30-microns thick) or thick sections (for example, 5,000-microns thick). According to some embodiments, sample preparation entails vacuum-pressure impregnation using a florescent-dyed epoxy. Normally, the sample is unstressed, although it is possible to apply external stress prior to epoxy injection, and to maintain stress until epoxy cures. It has been found that standard thin sections produce high enough resolution with low signal-to-noise ratios.

In block 1112, the rock sample is imaged. According to one embodiment, a Zeiss LSM 710 Upright Confocal Microscope is used to acquire sample images. It has been found that such a system is able to provide suitable high-resolution images (up to about 0.25 microns) with adequate coverage of the sample in a reasonable time frame. According to some alternative embodiments, an environmental scanning electron microscope (ESEM) can be used to provide higher resolution (nm-scale), but it has been found that in many applications the work is more time consuming and expensive. In addition, it has been found that ESEM images are uneven in illumination, due to charging at the surface of the uncoated samples. That being said, the workflow presented herein applies to images obtained by other means with little or no modifications, given that a good quality image is obtained.

According to some embodiments, imaging is automated using a computer. The confocal microscope scans through the sample in a grid pattern and records the image point by point. The output of this is tiles of images constituting one large 8-bit image. According to one embodiment, 8-bit was chosen instead of 16-bit to reduce the size of the files. However, it is generally better to choose the most accurate file type. Scale, in terms of microns per pixel, is also recorded. 30% overlap was used in the imaging process to ensure accurate seamless stitching. However, according to some embodiments, 10% or even 5% overlap can be used to accelerate the process.

In block 1114, the image is pre-processed and enhanced. The goal of this phase is to prepare the raw image for image analysis. Raw image tiles of 512 by 512 pixels in size, for example, are stitched to produce the complete image. According to some embodiments, an algorithm used for stitching is one developed by Preibisch, S., Saalfeld, S., and Tomancak, P., 2009, "Globally optimal stitching of tiled 3D microscopic image acquisitions:" Bioinformatics, v. 25, No. 11, p. 1463-1465 (hereinafter "Preibisch 2009"). The algorithm uses the fast Fourier transform (F)-based correlation to calculate the translational offsets between each tile. See Kuglin, C. D., and Hines, D.C., 1975, "The phase correlation image alignment method:" Proceedings of the IEEE, International Conference on Cybernetics and Society, p. 163-165 (hereinafter "Kuglin 1975"). In addition, the algorithm incorporates global registration to avoid error propagation due to tile alignment and blending (linear and non-linear) to give the most seamless transition.

The images are taken through a number of steps. Clipping and rotation are applied to produce square images, according to some embodiments. Manual adjustments using applications such as Photoshop or Paint.Net can be applied in order to remove some irregularities.

In block 1116, the image is segmented into grains and pores. According to some embodiments, the laboratory measured porosity is used to threshold the image and convert it into a binary image. The laboratory-measured porosity value is used to manually determine the best threshold value. Because the search interval is relatively small (between 1 and 254 for 8-bit images), a bisection method can be implemented and used. The bisection method is a root-finding algorithm that iteratively calculates the mid-point and selects the interval that contains the root. According to some embodiments, a more evolved optimization algorithm can be applied if one is dealing with larger intervals, as is the case with 16-bit images.

In block 1118, the representative element area is compared with the image size. The phase involves measuring porosity for random non-overlapping tiles of different sizes. The standard deviation (STD) is calculated for each tile size. Interpolation is done to reach the sample mean value and the REA is determined as the intersection of this interpolation.

Figure 12:
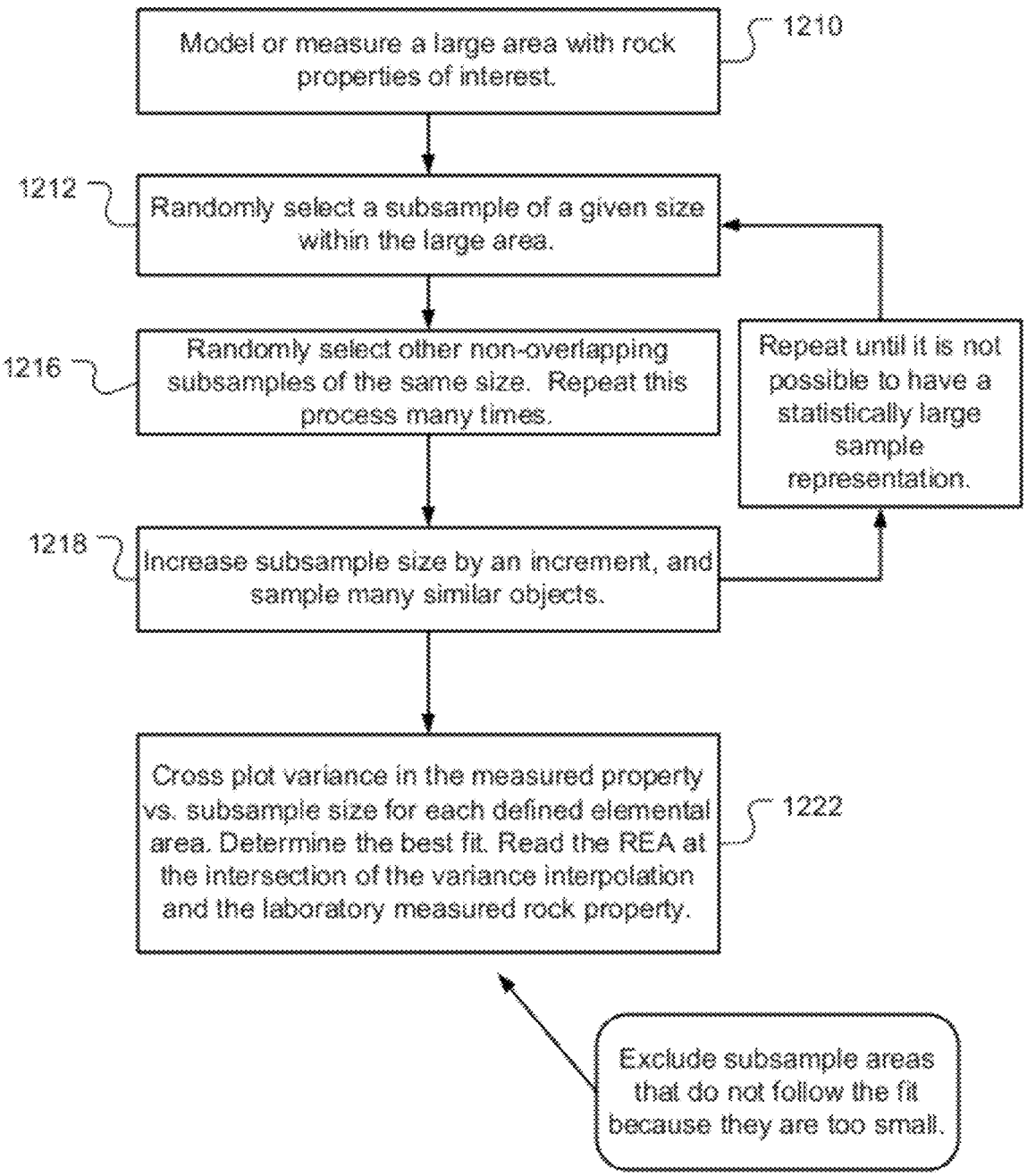
FIG. 12 is flow chart illustrating the basic workflow for determination of representative element area (REA), according to some embodiments.

FIG. 12 is flow chart illustrating the basic workflow for determination of representative element area (REA), according to some embodiments. Given an image composed of two constituents, e.g., grains and pores, one can measure porosity for different parts (or tiles) of the image. By measuring the porosity for different non-overlapping tiles of the same size, a standard deviation (STD) can be calculated. As the tile size increases, it is observed that the STD decreases. REA is determined using an iterative process, whereby variance in a given parameter, such as porosity, is measured for successively larger sample areas. REA is determined as the area where the standard deviation of the variance from the sample mean is zero, or an acceptable low value. Sample mean is laboratory-derived core-analysis porosity. In block 1210, a large area is modeled or measured with the rock properties of interest. In block 1212, a subsample of a given size within the large area is randomly selected. In block 1216, other non-overlapping subsamples of the same size are randomly selected. This is repeated many times. In block 1218, the subsample size is increased by an increment and many similar areas are sampled. The blocks 1212, 1216 and 1218 are repeated, according to some embodiments, until it is not possible to have a statistically large sample representation. In block 1222, the variance in measured property versus subsample size for each defined elemental area is cross plotted. The best fit is determined. The REA at the intersection of the variance interpolation and the laboratory measured rock property is read.

Referring again to FIG. 11, in block 1120, quality tests on the image are performed, according to some embodiments. CLAHE is applied to some images in an attempt to remove artificial unequal illumination, which is due to tilt of the sample on the imaging stage. Unsharp masking can be applied in some cases to assist the watershed transform in the separation of micropores. Because not all images require CLAHE or an unsharp mask, two tests were devised in order to automatically determine their need. A CLAHE process attempts to smooth artificial illumination problems. To test whether it is needed or not, a correlation test was performed using Equation 5. Note that this test assumes that the image is twice the size of the REA. The equation is:

$$C_h = \frac{2^{(10 \times Mean[CorrCoef(H_1, H_2) + CorrCoef(H_3, H_4)])}}{1024} \quad 0 < C_h \leq 1 \quad (5)$$

where the correlation coefficients are calculated for two histograms of non-overlapping parts of the as image as follows:

$$H_{1,2} = \text{Horizontal halves of the image} \quad (6)$$

$$H_{3,4} = \text{Vertical halves of the image} \quad (7)$$

If the result of this test is smaller than 0.85, CLAHE is performed on the image. This value is chosen by visual inspection of the images. Corresponding results can be changed depending on the circumstances.

To determine whether or not to apply the unsharp mask, correlation is again used to pick the best image. The sharpened and the original images are thresholded (see below) and a watershed transform is applied. The two resultant images are then correlated with the original image, and the image with the higher correlation factor is picked. Note that it is generally better to raise the laser gain during confocal microscopy acquisition rather than rely on this filter.

Figure 13:
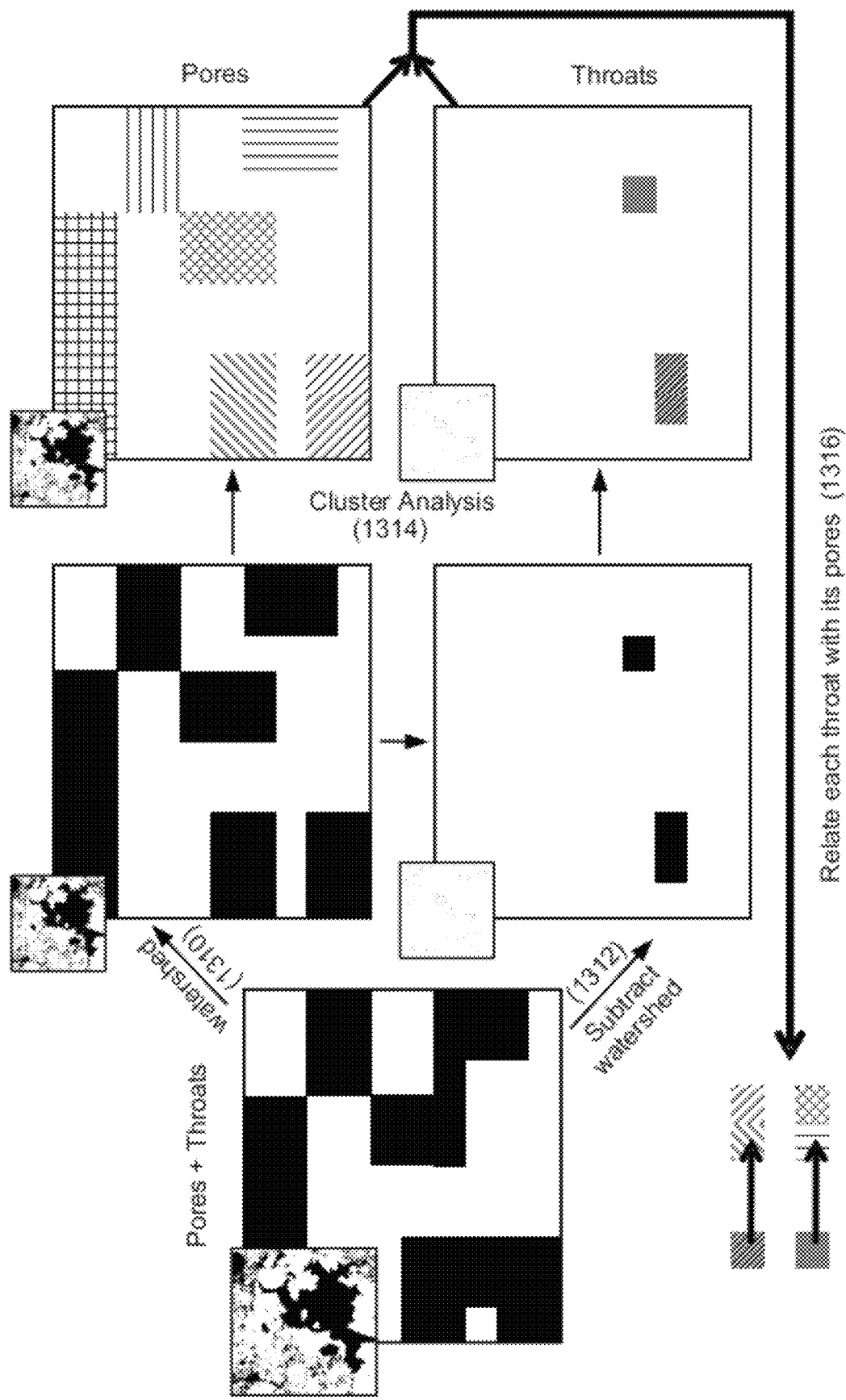
FIG. 13 illustrates a procedure to relate each pore throat with its adjacent pore bodies, according to some embodiments.

In block 1122 morphological operations are performed. The goal of this phase is to produce an accurate segmented binary image that is easy to analyze. Such a goal is generally hard to achieve. FIG. 13 depicts a pore and throat image analysis procedure, according to some embodiments. Pores and throats are separated or segmented using a watershed transform (1310 and 1312). Cluster analysis (1314) is used to label each pore and throat. A neighborhood search (1316) is used to relate throats and pores. By trial and error, it has been found that the region-growing watershedding algorithm implemented in ImageJ provides suitable results by avoiding over-segmentation.

Figure 14:
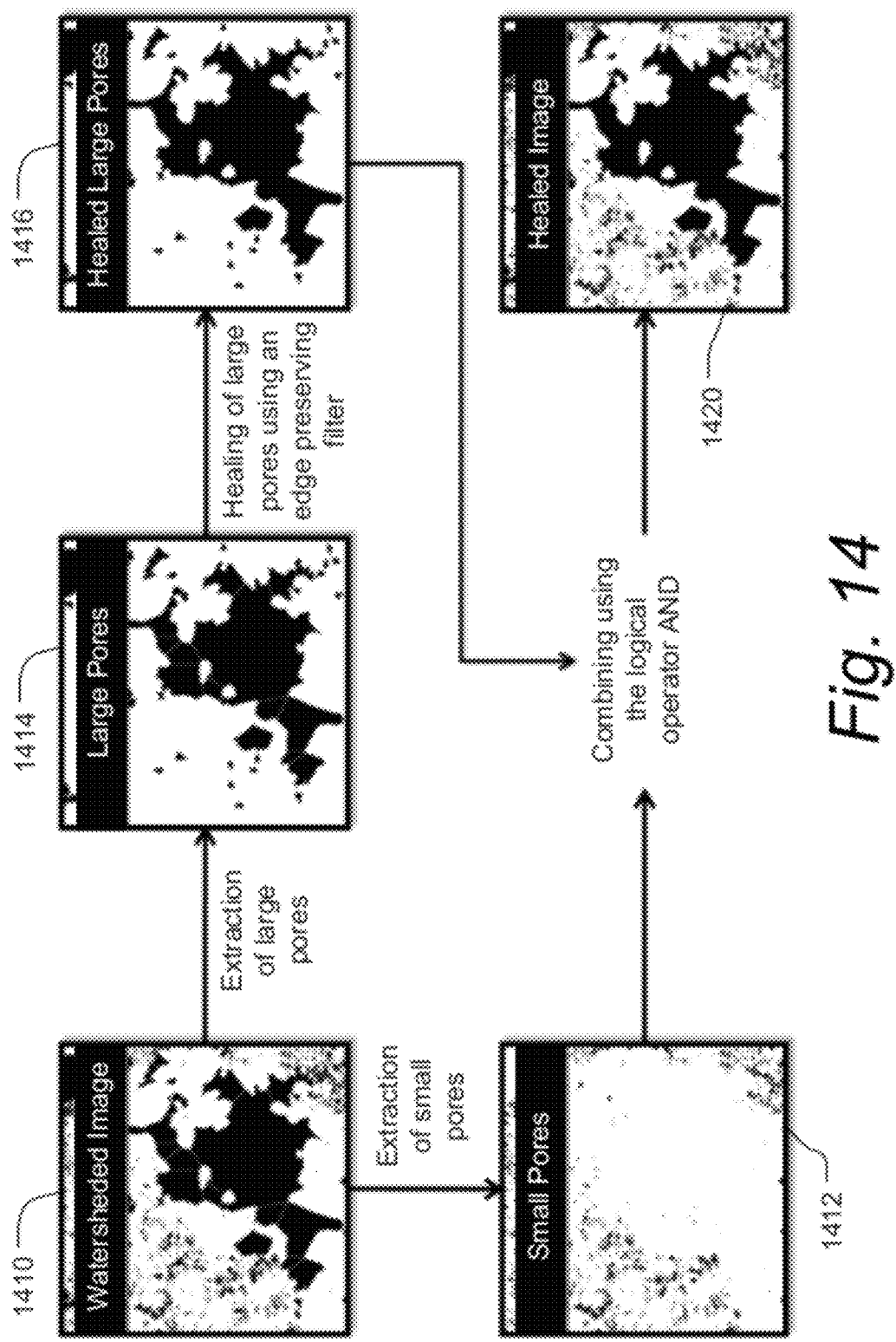
FIG. 14 illustrates a procedure to heal large pores, according to some embodiments.

FIG. 14 illustrates a procedure to heal large pores, according to some embodiments. It has been found that the watershed transform sometimes produces undesirable artifacts, in that some of the larger pores are segmented into smaller ones. To remedy this, according to some embodiments, the resultant watershedded binary image 1410 is separated into two images: micro-porosity image 1412 and macro-porosity image 1414. The macro-porosity image is treated with a specialized selective Kuwahara edge-preserving filter, applied to the removed pixels coded for this purpose. Unlike the use of a median filter, this filter resulted in restoring the large pores to their original state before the watershed transform, while maintaining the original shape of the pores (image 1416). The two images (micro- and macro-porosity images) are then combined to continue the analysis on the healed image 1420.

Figure 15:
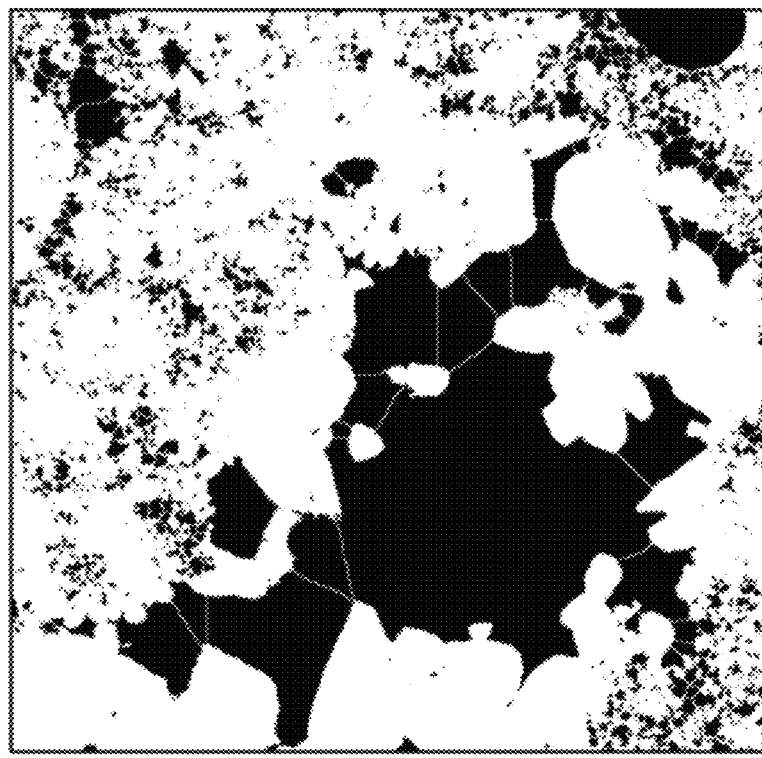
FIGS. 15 and 16 depict a typical pore image 1510 and throat image 1610 after processing of the binary image.
Figure 16:
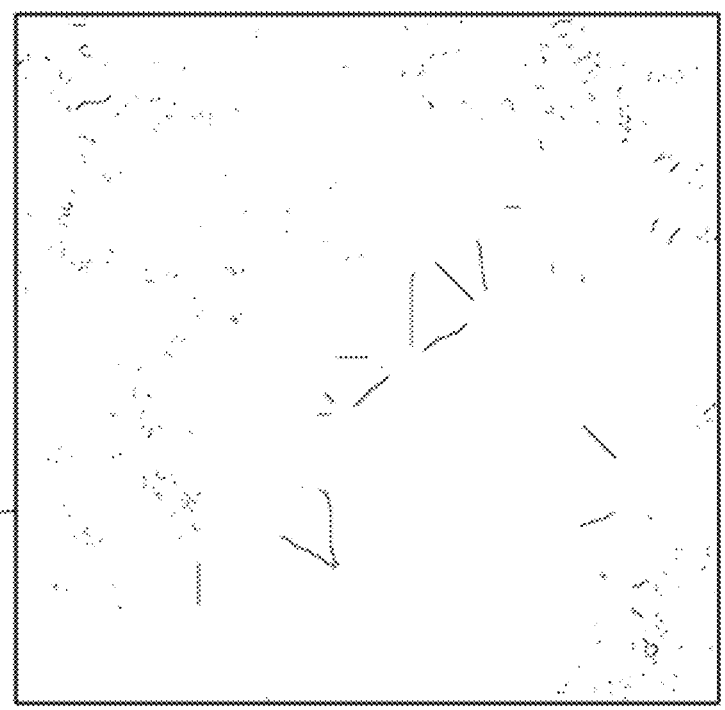

FIGS. 15 and 16 depict a typical pore image 1510 and throat image 1610 after processing of the binary image. In this example, no large pore healing was applied to produce these two images. As used in this description, "pores image" refers to the watershedded image (be it healed or not healed). To produce the "throats image," a simple binary logical operation was used to find the difference between the "pores image" and the original binary image.

Referring again to FIG. 11, the next phase involves clustering both the pores and throats images. According to some embodiments, a 4-connected implementation is applied to ensure that the diagonally connected clusters are separated. In block 1124, pore and throat measurements are performed. Calculations of the area of the pores and the maximum length of throats (to approximate diameter) are made. Relating throats and pores together is achieved by examining the pixel neighborhood of each throat. Each pore is assigned the diameter of the largest throat connected to it for reasons described in the Expanding Flow Model.

In block 1126, data analysis is performed. According to some embodiments, data analysis involves calculation steps which lead to numerical SCAL for the sample. The main inputs are the pore areas, and the diameter (length) of the largest throat for each pore.

Figure 17:
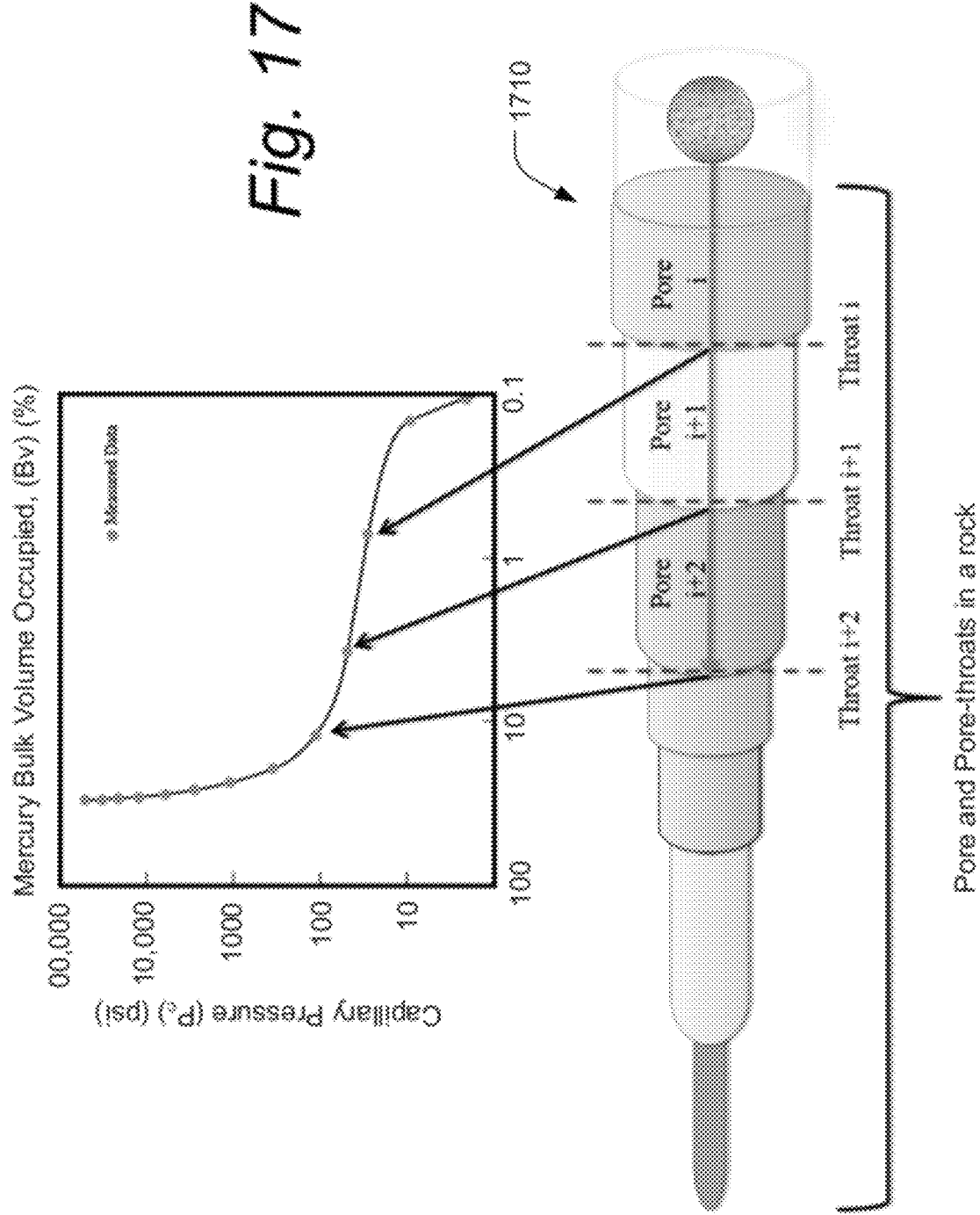
FIG. 17 depicts an EFM model for capillary pressure calculation. The pores are approximated by tubes and sorted in decreasing throat size (i.e. diameter)
Figure 18:
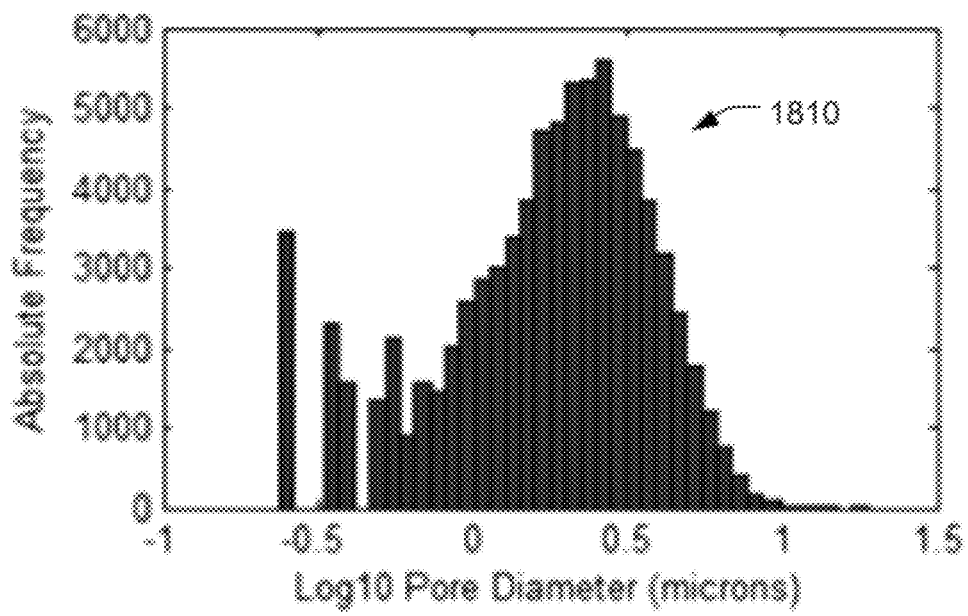
FIGS. 18-25 depict petrographic image analysis results for a sample, according to some embodiments.
Figure 19:
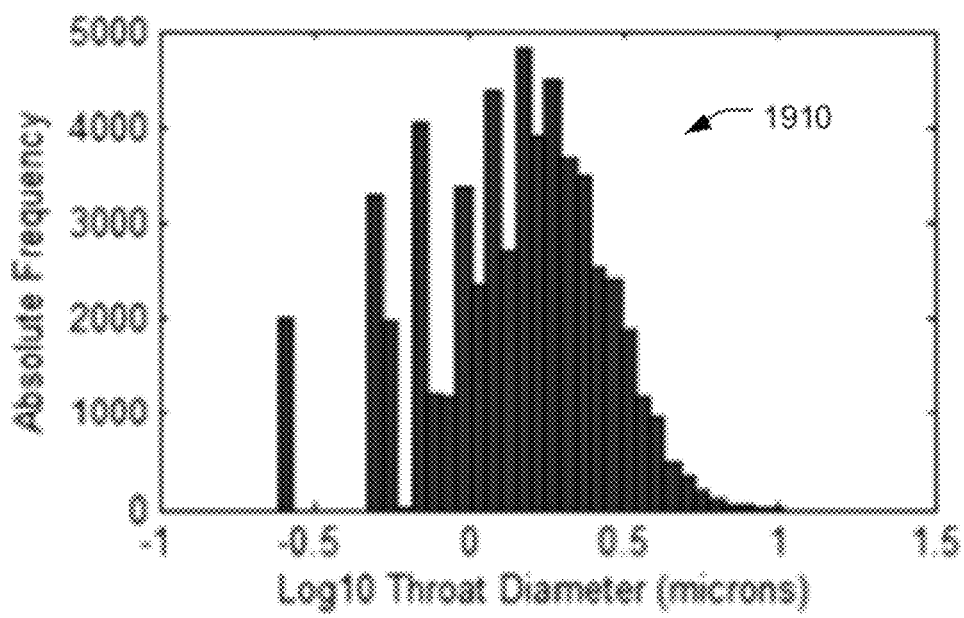
Figure 20:
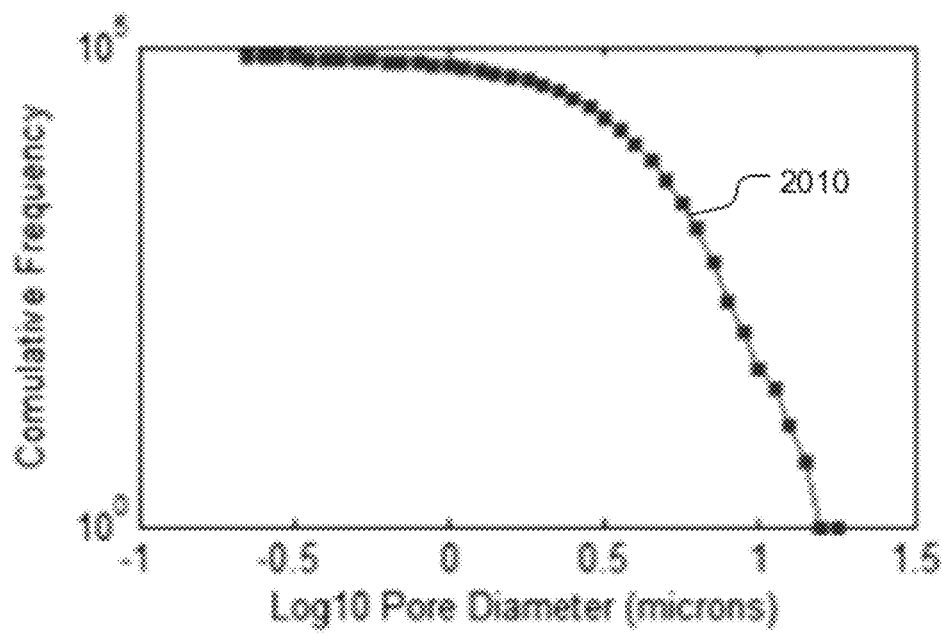
Figure 21:
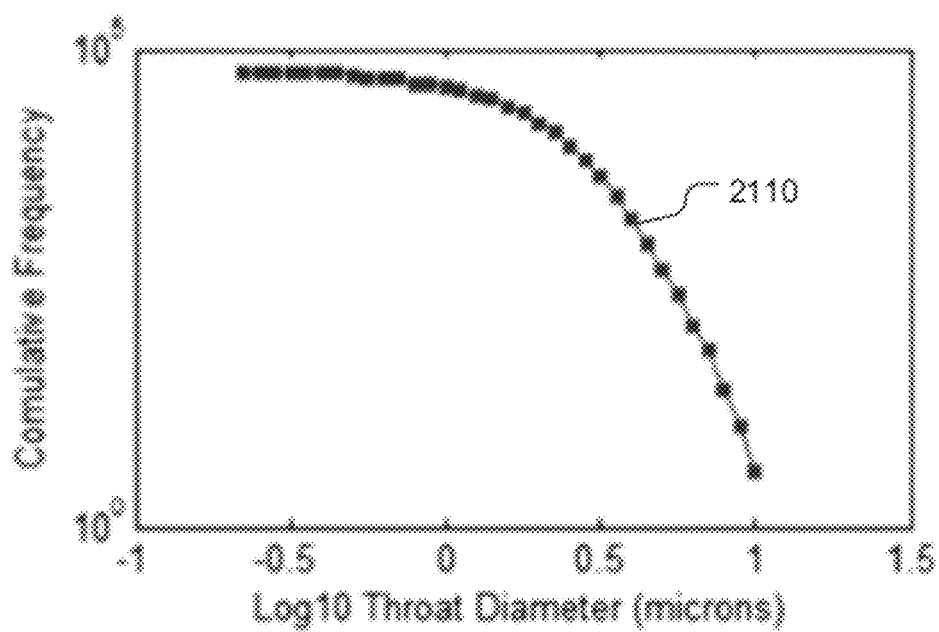
Figure 22:
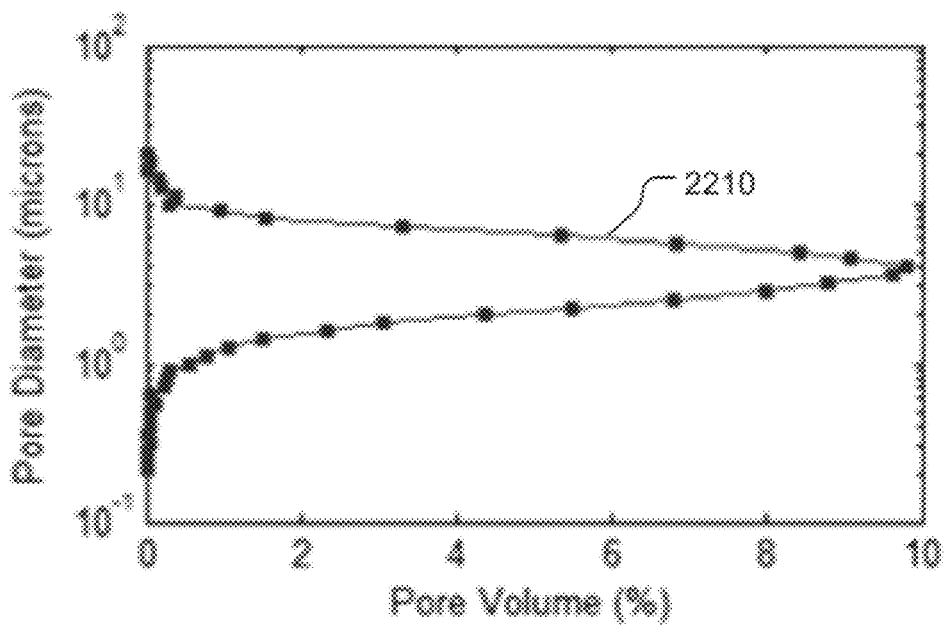
Figure 23:
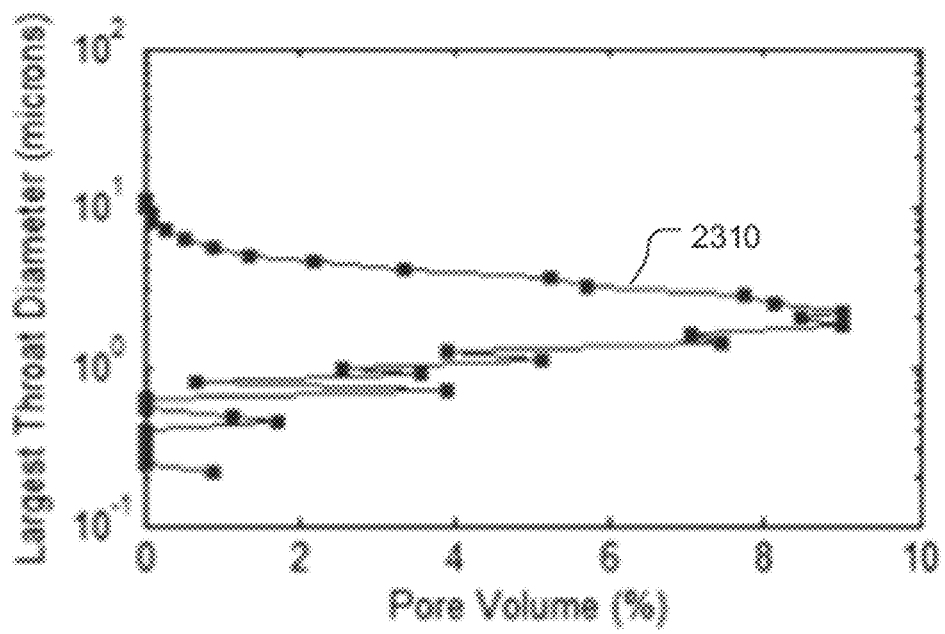
Figure 24:
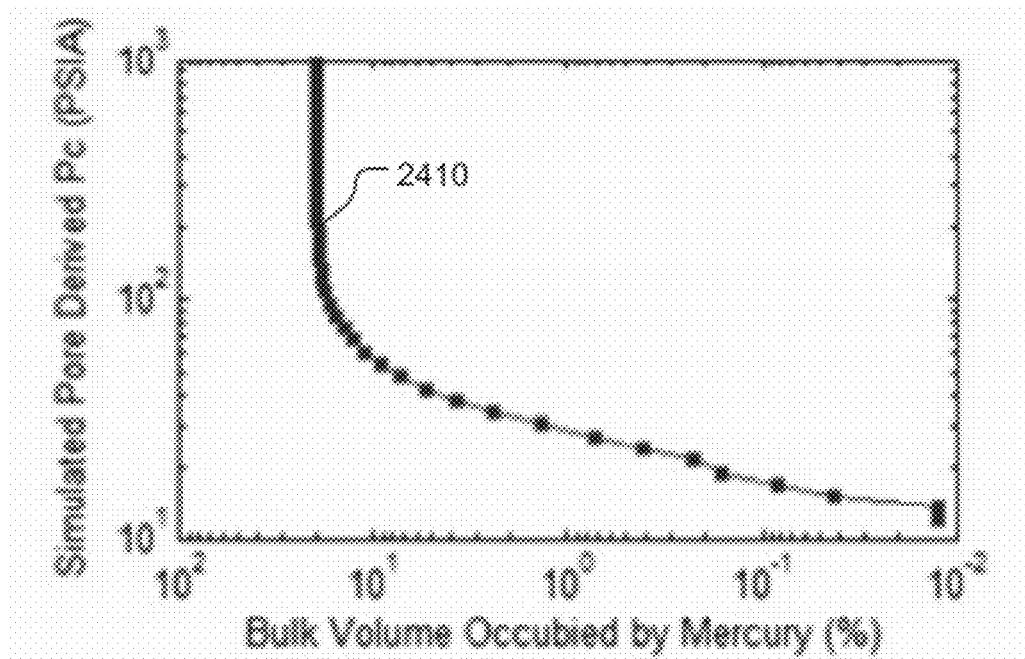
Figure 25:
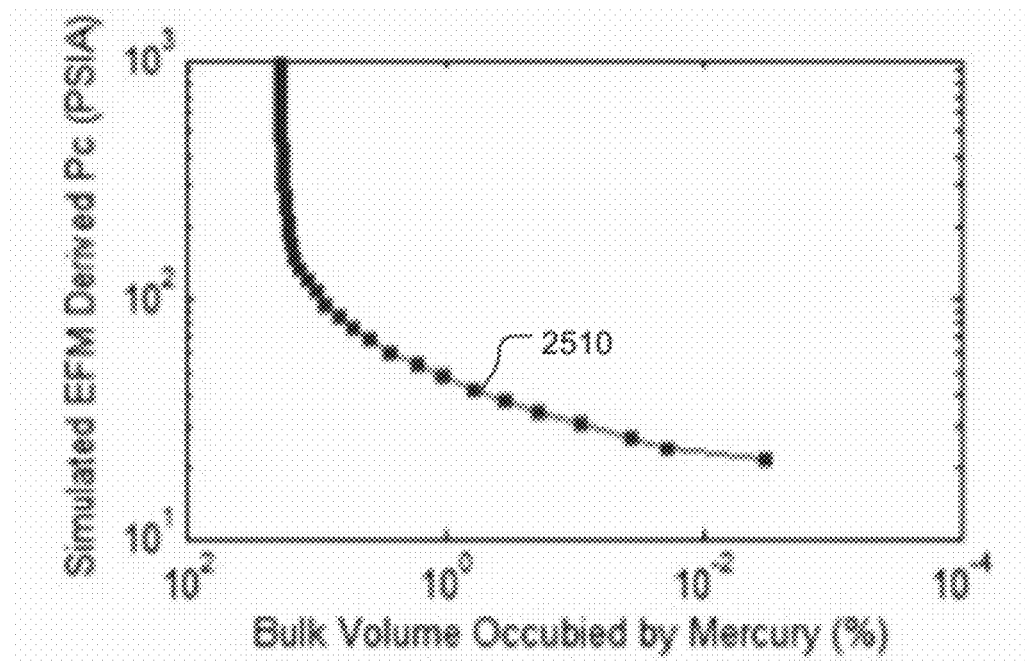

Plots of pore-size distribution, cumulative pore-size distribution, and fractional pore volume are produced using the measured pore areas. To produce a simulated capillary pressure curve, the data are filtered to remove isolated pores. This is done by excluding pores without any throats. The remaining pores are then binned according to their largest throat size. The total pore size for each bin is calculated and a porosity percentage is given. The cumulative porosity is calculated and used as a cumulative percentage. From these bins, a simulated capillary pressure value is calculated using Equation 1. These values, with the cumulative porosity, are plotted on a log-log scale to produce the well-known capillary pressure curve. FIG. 17 depicts an EFM model for capillary pressure calculation. The pores are approximated by tubes and sorted in decreasing throat size (i.e. diameter). As depicted in diagram 1710, each pore will act as a throat for the next pore with larger diameter.

Referring again to FIG. 11, in block 1128, confidence factor calculations are made. A confidence factor is calculated to give an idea about the error associated with the results. This is calculated by examining three parts: the image size compared to the representative element area (REA), the histogram of the gray-scale image, and an optional user-defined quality-control factor for artifacts. Equation 8 gives the relationship used. The factor is a positive unconstrained number. Generally, the larger the value, the greater the confidence, with 1 being a threshold between acceptable and unacceptable results. The equation is:

$$\zeta = C_s \times C_h \times C_u \qquad (8)$$

where $\zeta$ is the confidence factor, $C_s$, $C_h$, and $C_u$ are defined in Equations 9, 5, and 10 respectively. $C_s$ is defined to be equal to 1 when the image analyzed is double the size of the REA. This is done to ensure adequate sample representation. $C_h$ can be thought of as the residual uneven illumination.

$$C_s = \frac{\text{Size(Image)}}{2 \times \text{Size(REA)}} \quad C_s \geq 0 \qquad (9)$$

$C_u$ = User defined input reflecting image quality, $0 < C_u \leq 1$ (10)

It is will be recognized that a low $C_h$ will probably mean a low value in $C_s$ but the opposite is not true. $C_s$ is a measurement of the representative element area assuming a perfect image. Because most images are not perfect, $C_h$ was included in the calculation.

This procedure is illustrated by a sample composed of micrite and dolomite. Helium injection porosity was measured to be 20.7%. The pores are micropores. Applying the workflow described, pore-size distribution and capillary pressure curves were obtained.

FIGS. 18-25 depict petrographic image analysis results for a sample, according to some embodiments. The results shown are for images of a studied sample, taken by a handheld camera, a standard microscope, and a confocal microscope. The contrast test on the close-up confocal image returned a value of 0.97. This is considered a very good value and the contrast limited adoptive histogram equalization (CLAHE) was not needed. Thresholding produced a binary image similar to the confocal image. Watershedding separated the individual pores. The throat image shows extracted throats. The effective porosity for this sample was determined to be 18.60%, which is close to the Hg maximum cumulative bulk percentage porosity of 19.47%. Using a statistical approach and non-overlapping sub-sample areas of various sizes, REA was determined to be about 6 mm², much less than the image size of 16 mm². FIGS. 18-25 show the pore-size distribution graphs produced for this sample. Pore- and throat-size distribution data is plotted as absolute frequency (plots 1810 and 1910), cumulative frequency (2010 and 2110), and pore volume percentage (2210 and 2310). Pore-derived and throat-derived air-mercury capillary pressure curves are also plotted (2410 and 2510). It can be seen that the sample is monomodal with microporosity. The median and modal pore-body size is about 2 microns in diameter.

An example for 3D images will now be described in greater detail. Laser scanning fluorescence microscopy allows us to acquire stacked image slices from the same rock, which results in 3D images of pore systems. Image registration is applied to fit slices on top of each other and generate 3D images.

Figure 26:
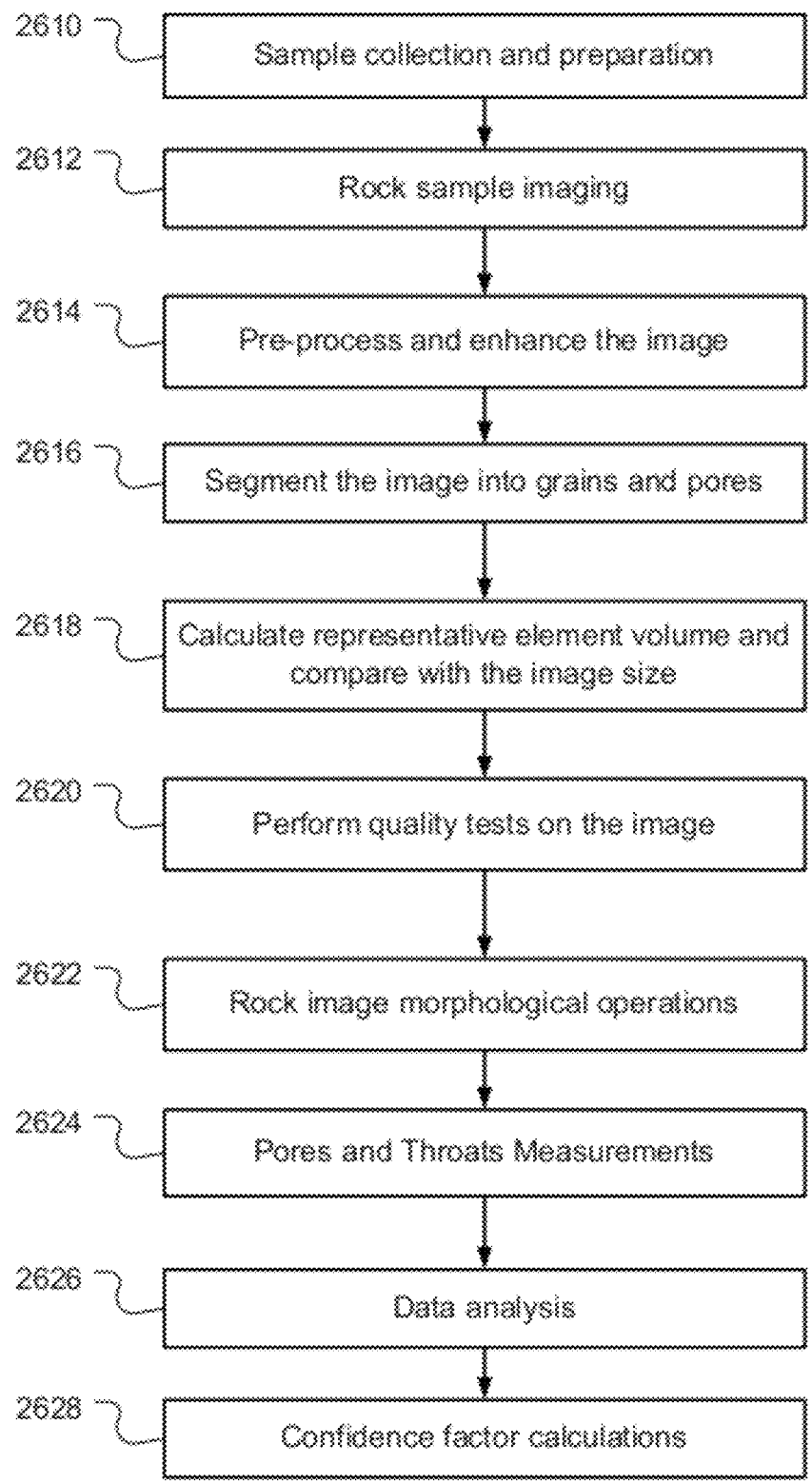
FIG. 26 is a flow chart illustrating a 3D workflow according to some embodiments.

FIG. 26 is a flow chart illustrating a 3D workflow according to some embodiments. In block 2610 a sample is collected and prepared. The goal of this phase is to prepare the sample for imaging. The system presented here uses high-resolution microscopic images. Any high-resolution grayscale images are sufficient. Sample preparation depends on the type of microscope used. According to some embodiments, a confocal microscope was used with standard thin sections (30-microns thick) or thick sections (for example, 5,000-microns thick). According to some embodiments, sample preparation entails vacuum-pressure impregnation using a florescent-dyed epoxy. Normally, the sample is unstressed, although it is possible to apply external stress prior to epoxy injection, and to maintain stress until epoxy cures. It has been found that standard thin sections produce high enough resolution with low signal-to-noise ratios, so they can be used in this analysis.

In block 2612, the rock sample is imaged. According to one embodiment, a Zeiss LSM 710 Upright Confocal Microscope was used to acquire sample images. It has been found that such a system is able to provide suitable high-resolution images (up to about 0.25 microns) with adequate coverage of the sample in a reasonable time frame. Vertical stacks with a spacing of 0.4 microns, for example, are acquired through the sample. The workflow described herein applies to 3D images obtained by any other means with little or no modifications, given that a good quality image is obtained.

According to some embodiments, imaging is automated using a computer. For each vertical step (z-step), the confocal microscope scans through the sample in a grid pattern and records the image point by point. The output of this step is tiles of images constituting one large 8-bit image. According to some embodiments, 8-bit was chosen instead of 16-bit to reduce the size of the files. However, it is generally better to choose the most accurate file type. Scale, in terms of microns per pixel, is also recorded. 30% overlap was used in the imaging process to ensure accurate seamless stitching. However, 10% or perhaps even 5% overlap can be used to accelerate the process.

In block 2614, the image is pre-processed and enhanced. The goal of this phase is to prepare the raw image for image analysis. For each vertical step (z-step), the raw image tiles of 512 by 512 pixels in size, for example, were stitched to produce the complete image. As in the 2D example the algorithm used for stitching can be as discussed in Preibisch 2009. That algorithm uses the fast Fourier transform (F)-based correlation to calculate the translational offsets between each tile (Kuglin 1975). In addition, the algorithm incorporates global registration to avoid error propagation due to tile alignment and blending (linear and non-linear) to give the most seamless transition.

The images produced were taken through a number of steps. Clipping and rotation was applied to produce square images. Manual adjustments in Photoshop or Paint.Net were applied in order to remove some irregularities. Image normalization is commonly needed to adjust brightness of individual z-steps to match a chosen standard.

In block 2616, the image is segmented into grains and pores. According to some embodiments the laboratory measured porosity is used to threshold the image and convert it into a binary image. Because automatic thresholding methods give results highly dependent on image quality and histogram distribution, they cannot be used. The laboratory-measured porosity value is used to manually determine the best threshold value. Because the search interval is relatively small (between 1 and 254 for 8-bit images), the bisection method was implemented and used. The bisection method is a root-finding algorithm that iteratively calculates the mid-point and selects the interval that contains the root. According to some embodiments, a more evolved optimization algorithm can be applied if one is dealing with larger intervals, as is the case with 16-bit images.

In block 2618, the representative element volume is compared with the image size. The phase involves measuring porosity for random non-overlapping cubes of different sizes. The standard deviation (STD) is calculated for each cube size. Interpolation is done to reach the sample mean value and the REV is determined as the intersection of this interpolation.

Figure 27:
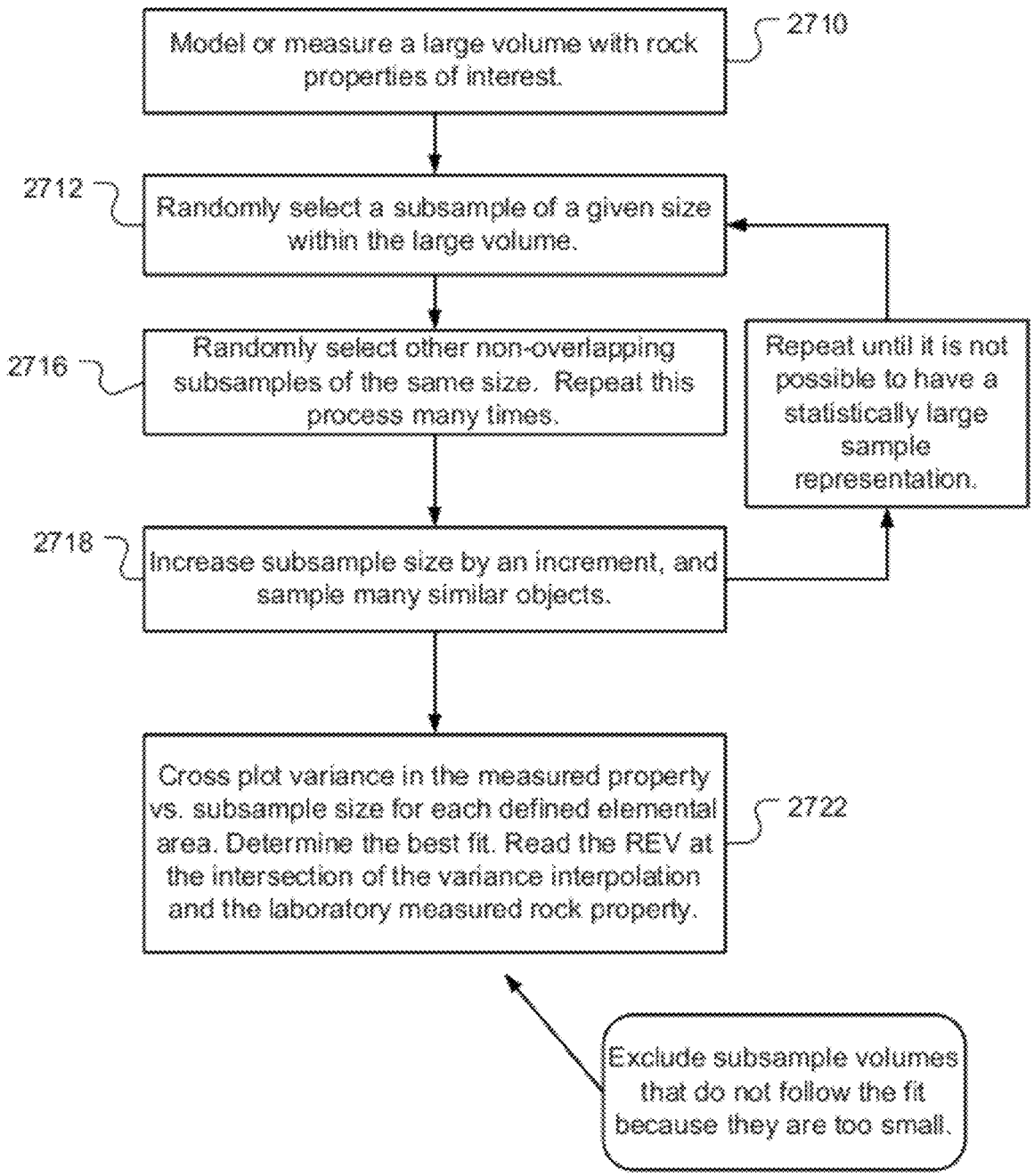
FIG. 27 is flow chart illustrating the basic workflow for determination of representative element volume (REV), according to some embodiments

FIG. 27 is flow chart illustrating the basic workflow for determination of representative element volume (REV), according to some embodiments. Given an image composed of two constituents, e.g., grains and pores, one can measure porosity for different volumes of the image. By measuring the porosity for different non-overlapping volumes of the same size, a standard deviation (STD) can be calculated. As the sub-sample volume increases, it is observed that the STD decreases. REV is determined using an iterative process, whereby variance in a given parameter, such as porosity, is measured for successively larger sample volumes. REV is determined as the area where the standard deviation of the variance from the sample mean is zero, or an acceptable low value. Sample mean is laboratory-derived core-analysis porosity. In block 2710, a large volume is modeled or measured with the rock properties of interest. In block 2712, a subsample of a given size within the large volume is randomly selected. In block 2716, other non-overlapping subsamples of the same size are randomly selected. This is repeated many times. In block 2718, the subsample size is increased by an increment and many similar objects are sampled. The blocks 2712, 2716 and 2718 are repeated, according to some embodiments, until it is not possible to have a statistically large sample representation. In block 2722, the variance in measured property versus subsample size for each defined elemental volume is cross plotted. The best fit is determined. The REV at the intersection of the variance interpolation and the laboratory measured rock property is read.

Referring again to FIG. 26, in block 2620, quality tests on the image are performed, according to some embodiments. CLAHE is applied to some images in an attempt to remove artificial unequal illumination, which is due to tilt of the sample on the imaging stage. Unsharp mask is applied in rare cases to assist the watershed transform in the separation of micropores. Because not all images require CLAHE or unsharp mask, two tests were devised in order to automatically determine their need. A CLAHE process attempts to smooth artificial illumination problems. To test whether it is needed or not, a correlation test was performed using Equation 5. Note that this test assumes that the image is twice the size of the REV. Use equations 5 through 7, as illustrated in the 2D workflow.

If the result of this test is smaller than 0.85, CLAHE is performed on the image. This value is chosen by visual inspection of the images. Corresponding results can be changed depending on the circumstances.

To determine whether or not to apply the unsharp mask, correlation is again used to pick the best image. The sharpened and the original images are thresholded (see below) and a watershed transform is applied. The two resultant images are then correlated with the original image, and the image with the higher correlation factor is picked. Note that it is better to raise the laser gain during confocal microscopy acquisition rather than rely on this filter.

In block 2622 morphological operations are preformed. The goal of this phase is to produce an accurate segmented binary image that is easy to analyze. Such a goal is generally hard to achieve. The pores in the binary image are segmented and separated using the watershed transform.

The watershed transform sometimes produces undesirable artifacts, in that some of the larger pores are segmented into smaller ones. To remedy this, the resultant watershedded binary image is separated into two images: micro-porosity image and macro-porosity image. The macro-porosity image is treated with a specialized selective Kuwahara edge-preserving filter, applied to the removed pixels coded for this purpose. Unlike the use of a median filter, this filter resulted in restoring the large pores to their original state before the watershed transform, while maintaining the original shape of the pores. The two images (micro- and macro-porosity images) were then combined to continue the analysis.

The next step involved clustering both the pores and throats images. A 6-connected implementation was applied to ensure that the diagonally connected clusters are separated. In block 2624, pore and throat measurements are performed. Calculations of the volume of the pores and the area of throats were performed. Relating throats and pores together is done by examining the pixel neighborhood of each throat. Each pore is assigned the diameter of the largest throat connected to it for reasons described in the Expanding Flow Model.

In block 2626, data analysis is performed. According to some embodiments, data analysis involves calculation steps which lead to numerical SCAL for the sample. The main inputs are the pore volumes, and the diameter of the largest throat for each pore. Plots of pore-size distribution, cumulative pore-size distribution, and fractional pore volume were produced using the measured pore areas. To produce a simulated capillary pressure curve, the data were filtered to remove isolated pores. This is done by excluding pores without any throats. The remaining pores are then binned according to their largest throat size. The total pore size for each bin is calculated and a porosity percentage is given. The cumulative porosity is calculated and used as a cumulative percentage. From these bins, a simulated capillary pressure value is calculated using Equation 1. These values, with the cumulative porosity, are plotted on a log-log scale to produce the well-known capillary pressure curve.

In block 2628, confidence factor calculations are made. A confidence factor is calculated to give an idea about the error associated with the results. This is calculated by examining three parts: the image size compared to the representative element volume (REV), the histogram of the gray-scale image, and an optional user-defined quality-control factor for artifacts (see Equations 8, 9, and 10, and the 2D workflow of FIG. 11). The factor is a positive unconstrained number. Generally, the larger the value, the greater the confidence, with 1 being a threshold between acceptable and unacceptable results.

While the subject disclosure is described through the above embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the subject disclosure should not be viewed as limited except by the scope and spirit of the appended claims.

What is claimed is:

1. A method for characterizing a sample of porous media including a plurality of pore bodies and a plurality of pore throats, the method comprising:
    preparing the sample of the porous media such that a single plane of the sample can be imaged;
    generating a two-dimensional high resolution image of the single plane of the prepared sample of the porous media;
    processing the high resolution image in part by carrying out a watershed image processing technique;

identifying a plurality of pore throats based at least in part on the watershed technique; and determining a dimension associated with each of the identified plurality of pore throats and wherein the processing is carried out with a processing system.

2. A method according to claim 1 wherein the high resolution image is made using confocal microscopy.

3. A method according to claim 2 wherein the high resolution image is made using laser scanning fluorescence microscopy.

4. A method according to claim 2 wherein a depth of field of the high resolution image is less than 0.4 microns.

5. A method according to claim 1 wherein the porous media is a rock sample.

6. A method according to claim 5 wherein the preparing includes subjecting the sample of porous media to vacuum-pressure impregnation with fluorescing epoxy.

7. A method according to claim 5 wherein the preparing includes cutting the sample of porous media into a thin slice of less than about 100 microns thickness.

8. A method according to claim 5 wherein the preparing includes cutting the sample of porous media into a thick slice of greater than about 2000 microns thickness.

9. A method according to claim 1 wherein the porous media is a subterranean rock formation.

10. A method according to claim 9 wherein the subterranean rock formation is hydrocarbon bearing.

11. A method according to claim 10 wherein the porous media is a core sample from the rock formation.

12. A method according to claim 1 wherein the watershed technique includes simulated flooding.

13. A method according to claim 1 further comprising determining pore-body and pore-throat size distributions and capillary pressure curves in the porous media based at least in part on the watershed technique.

14. A method according to claim 1 wherein the processing includes one or more pre-processing and enhancement techniques selected from a group consisting of: stitching, registration, blending, clipping and rotation.

15. A method according to claim 1 wherein the processing includes segmenting the high resolution image into grains and pores, thereby generating a binary image.

16. A method according to claim 15 wherein a porosity value from an analysis of the porous media is used to control a threshold in the segmentation.

17. A method according to claim 15 wherein a binary image is separated into a pores image and a throats image using one or more binary logical operations.

18. A method according to claim 17 wherein the pores image and throats image are differentiated using one or more clustering algorithms thereby generating a clustered pores image and a clustered throats image, and pore-body and pore-throat size distributions are computed based on clustered images.

19. A method according to claim 18 wherein the clustered pores image and throats image are subjected to data analysis wherein each pore body is assigned a diameter of a largest pore throat connected to the pore body, and each pore body has a known pore area, and pores having at least one connected throat are binned according to largest throat size, and pore-body size for each bin is computed and used to generate simulated capillary pressure curves using a Washburn equation.

20. A method according to claim 1 wherein the sample of the porous media is two-dimensional.

21. A method according to claim 1 wherein the sample of the porous media is three-dimensional.

22. A system for characterizing a sample of porous media including a plurality of pore bodies and a plurality of pore throats, the system comprising:

a sample preparation system adapted to prepare a sample of the porous media such that a single plane of the sample can be imaged;

an imaging system adapted to generate a two-dimensional high resolution image of a single plane of a prepared sample of the porous media; and a processing system adapted and programmed to process a generated two-dimensional high resolution image in part by carrying out a watershed image processing technique, to identify a plurality of pore throats based at least in part on the watershed technique; and to determine a dimension associated with each of the identified plurality of pore throats.

23. A system according to claim 22 further comprising a sample collection system adapted to collect a sample of the porous media.

24. A system according to claim 23 wherein the porous media is a hydrocarbon bearing subterranean rock formation, and the sample collection system includes a core-sampling tool.

25. A system according to claim 22 wherein the imaging system uses laser scanning fluorescence microscopy.

26. A system according to claim 22 wherein the processing system is further adapted and programmed to determine pore-body and pore-throat size distributions and capillary pressure curves in the porous media based at least in part on the watershed technique.

27. A method for characterizing a sample of porous subterranean rock formation including a plurality of pore bodies and a plurality of pore throats, the method comprising:

preparing the sample of porous subterranean rock formation such that a single plane of the sample can be imaged;

generating a two-dimensional high resolution image of the single plane of the prepared sample of the rock using laser scanning fluorescence microscopy;

segmenting the high resolution image into grains and pores, thereby generating a binary image processing the binary image by carrying out a watershed image processing technique;

identifying a plurality of pore throats based at least in part on the watershed technique; and determining a throat length dimension associated with each of the identified plurality of pore throats, and determining pore-body and pore-throat size distributions and capillary pressure curves in the porous media based at least in part on the watershed technique.

28. A method according to claim 27 wherein the porous rock formation is a hydrocarbon bearing subterranean rock formation.

29. A method according to claim 27 wherein a porosity value from an analysis of the porous rock is used to control a threshold in the segmenting.

* * * * *